US012639780B2

(12) United States Patent 
Nandanwar et al.

(10) Patent No.: US 12,639,780 B2
(45) Date of Patent: May 26, 2026

(54) WARP ACCESS PATTERN-AWARE CACHES

(71) Applicant: QUALCOMM Incorporated, San Diego, CA (US)

(72) Inventors: Darshan Kumar Nandanwar, Bangalore (IN); Pavan Kumar Akkaraju, Bangalore (IN); Kartik Gunvantbhai Desai, Savarkundla (IN)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 18/536,019

(22) Filed: Dec. 11, 2023

(65) Prior Publication Data

US 2025/0191112 A1     Jun. 12, 2025

(51) Int. Cl.
  G06T 1/60 (2006.01)
  G06F 12/0811 (2016.01)
(52) U.S. Cl.
  CPC ............ G06T 1/60 (2013.01); G06F 12/0811 (2013.01)
(58) Field of Classification Search
  USPC ........................................................ 345/531
  See application file for complete search history.

(56) References Cited

U.S. PATENT DOCUMENTS

2018/0060399 A1 * 3/2018 Lee .................... G06F 16/24532
2023/0195639 A1 * 6/2023 Sharma ............... G06F 12/0897
                                                    711/129

OTHER PUBLICATIONS

International Search Report And Written Opinion—PCT/US2024/055766—ISA/EPO—Feb. 13, 2025.
Lal S., et al., "A Quantitative Study of Locality in GPU Caches for Memory-Divergent Workloads", International Journal of Parallel Programming, Plenum Press, New York, US, Vol. 50, No. 2, Apr.1 , 2022, pp. 189-216, XP037813975, 28 Pages, The whole document.
Zhang J., et al., "Memory-Aware TLP Throttling and Cache Bypassing for GPUs", Cluster Computing, Baltzer Science Publishers, Bussum, NL, vol. 22, No. 1, Nov. 27, 2017, pp. 871-883, XP036859413, 13 Pages, The whole document.

* cited by examiner

*Primary Examiner* — James A Thompson
*Assistant Examiner* — Kim Thanh T Tran
(74) *Attorney, Agent, or Firm* — Procopio, Cory, Hargreaves & Savitch LLP

(57)     ABSTRACT

Aspects presented herein relate to methods and devices for data or graphics processing including an apparatus, e.g., a GPU. The apparatus may obtain an indication of a set of data threads corresponding to a set of workloads. The apparatus may also identify a locality of each of the set of workloads corresponding to the set of data threads. Further, the apparatus may store the access pattern of the at least one cache line for a first set of workloads in the set of workloads, where the first set of workloads corresponds to a first set of data threads in the set of data threads. The apparatus may also store, or refrain from storing, data for at least one second set of workloads in the set of workloads based on the access pattern of the at least one cache line for the first set of workloads.

19 Claims, 15 Drawing Sheets

100

800

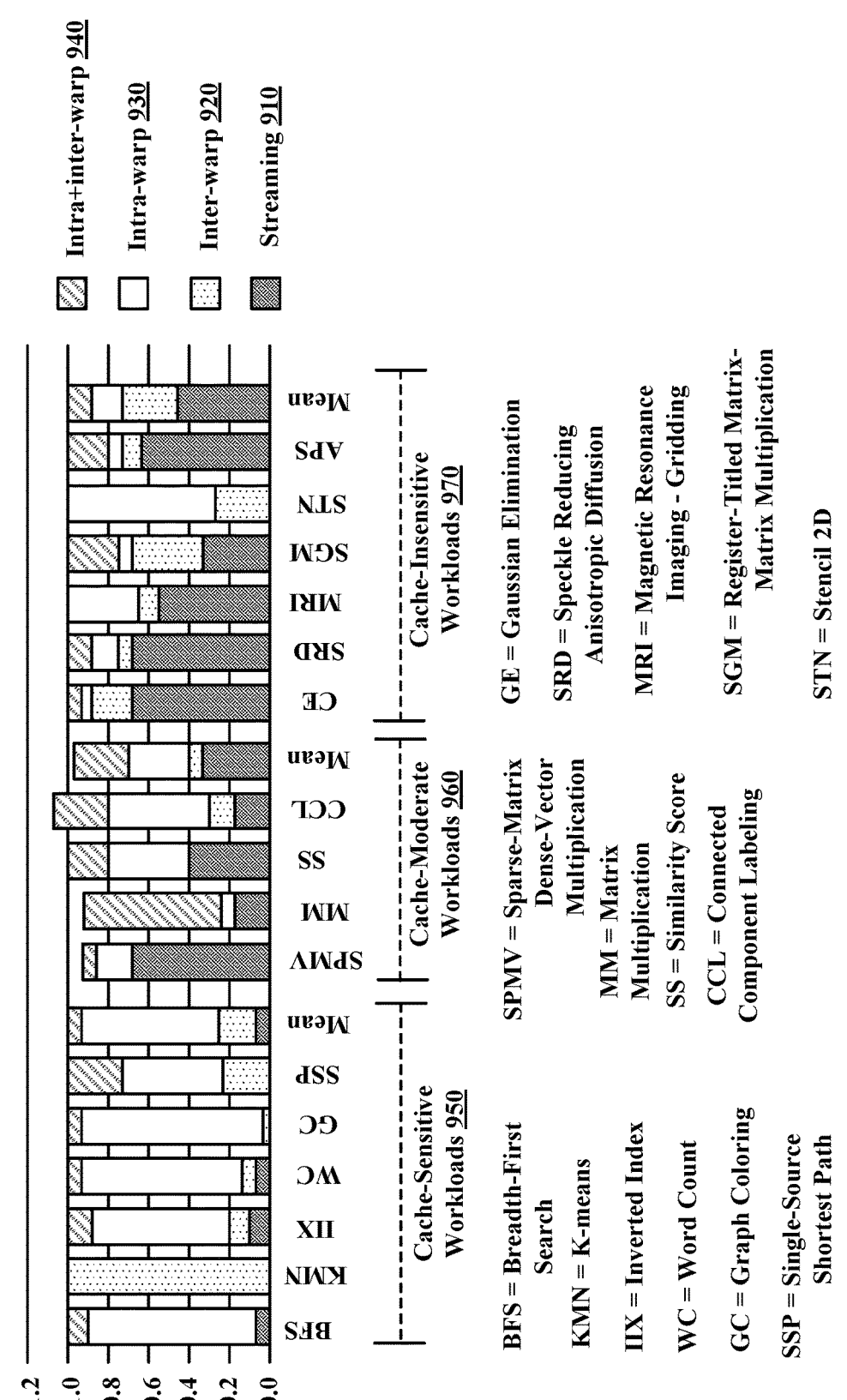

Graph 902 of Data Locality Type for GPU Workloads

Intra+inter-warp 940
Intra-warp 930
Inter-warp 920
Streaming 910

Cache-Sensitive Workloads 950

Cache-Moderate Workloads 960

Cache-Insensitive Workloads 970

BFS = Breadth-First Search

KMN = K-means

IIX = Inverted Index

WC = Word Count

GC = Graph Coloring

SSP = Single-Source Shortest Path

SPMV = Sparse-Matrix Dense-Vector Multiplication

MM = Matrix Multiplication

SS = Similarity Score

CCL = Connected Component Labeling

GE = Gaussian Elimination

SRD = Speckle Reducing Anisotropic Diffusion

MRI = Magnetic Resonance Imaging - Gridding

SGM = Register-Titled Matrix-Matrix Multiplication

STN = Stencil 2D

APS = All Pairs Shortest Path

Figure 12:
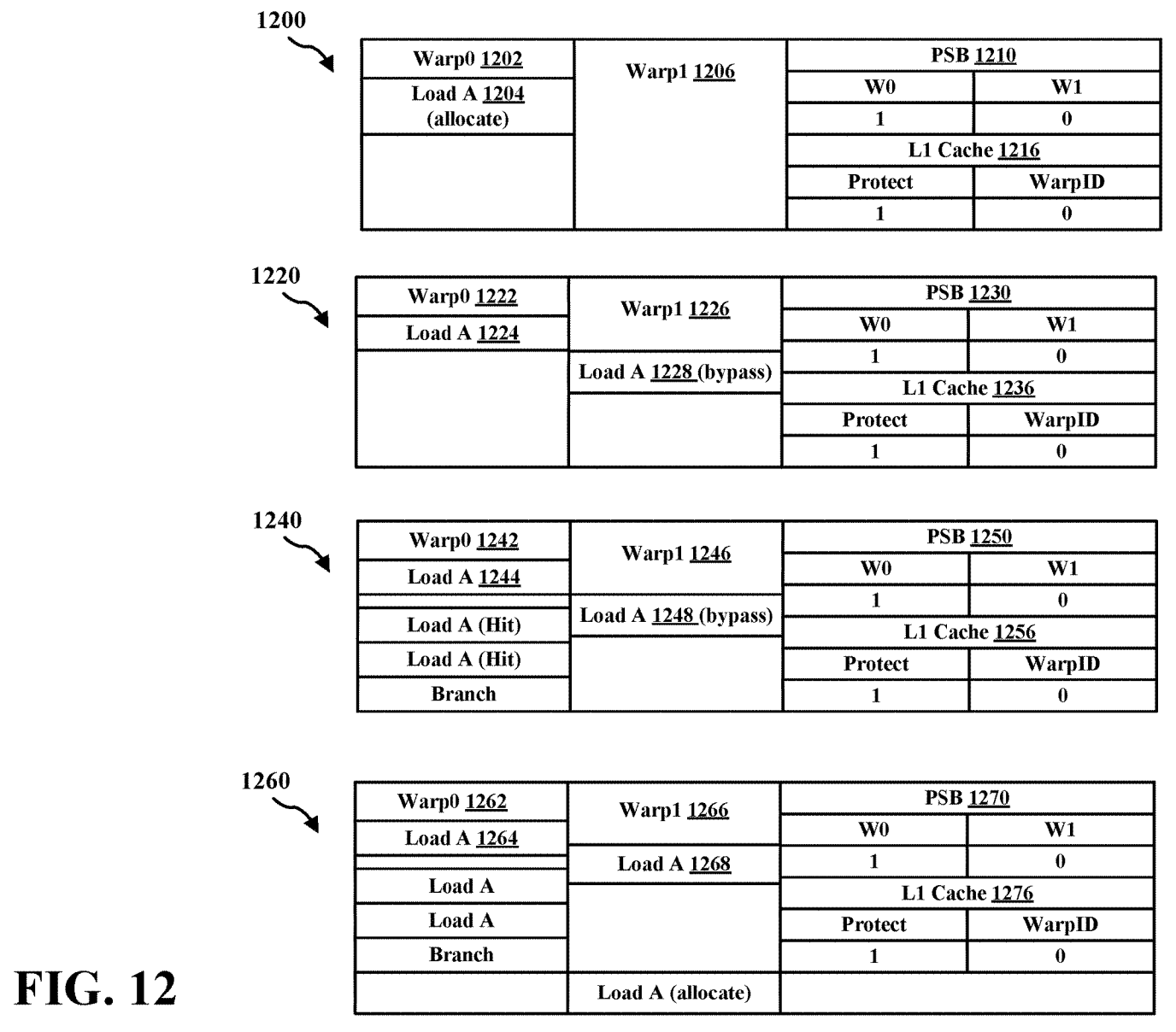

| | PSB 1210 | | |
|---|---|---|---|
| | W0 | W1 | |
| | 1 | 0 | |
| | L1 Cache 1216 | | WarpID |
| | Protect | | 0 |
| | 1 | | |

| Warp0 1202 | Warp1 1206 |
|---|---|
| Load A 1204 (allocate) | |

1200

| | PSB 1230 | | |
|---|---|---|---|
| | W0 | W1 | |
| | 1 | 0 | |
| | L1 Cache 1236 | | WarpID |
| | Protect | | 0 |
| | 1 | | |

| Warp0 1222 | Warp1 1226 |
|---|---|
| Load A 1224 | Load A 1228 (bypass) |

1220

| | PSB 1250 | | |
|---|---|---|---|
| | W0 | W1 | |
| | 1 | 0 | |
| | L1 Cache 1256 | | WarpID |
| | Protect | | 0 |
| | 1 | | |

| Warp0 1242 | Warp1 1246 |
|---|---|
| Load A 1244 | Load A 1248 (bypass) |
| Load A (Hit) | |
| Load A (Hit) | |
| Branch | |

1240

| | PSB 1270 | | |
|---|---|---|---|
| | W0 | W1 | |
| | 1 | 0 | |
| | L1 Cache 1276 | | WarpID |
| | Protect | | 0 |
| | 1 | | |

| Warp0 1262 | Warp1 1266 |
|---|---|
| Load A 1264 | Load A 1268 |
| Load A | |
| Load A | |
| Branch | |
| | Load A (allocate) |

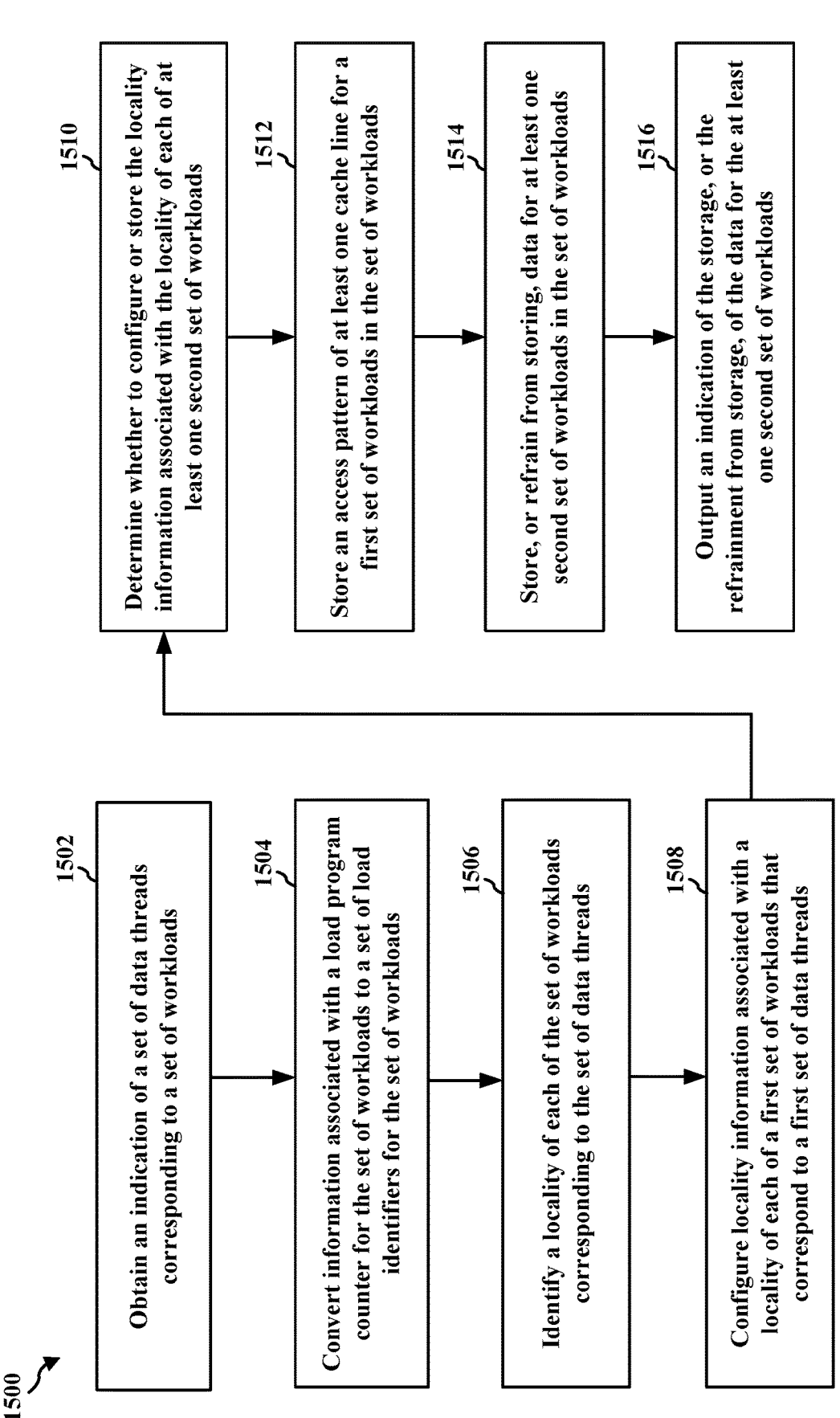

1510

Determine whether to configure or store the locality information associated with the locality of each of at least one second set of workloads

1512

Store an access pattern of at least one cache line for a first set of workloads in the set of workloads

1514

Store, or refrain from storing, data for at least one second set of workloads in the set of workloads

1516

Output an indication of the storage, or the refrainment from storage, of the data for the at least one second set of workloads

1502

Obtain an indication of a set of data threads corresponding to a set of workloads

1504

Convert information associated with a load program counter for the set of workloads to a set of load identifiers for the set of workloads

1506

Identify a locality of each of the set of workloads corresponding to the set of data threads

1508

Configure locality information associated with a locality of each of a first set of workloads that correspond to a first set of data threads

WARP ACCESS PATTERN-AWARE CACHES

TECHNICAL FIELD

The present disclosure relates generally to processing systems and, more particularly, to one or more techniques for graphics or data processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a central processing unit (CPU), or any apparatus that may perform for data processing or graphics processing. The apparatus may obtain an indication of a set of data threads associated with graphics processing, where the set of data threads corresponds to a set of workloads. The apparatus may also convert information associated with a load program counter (PC) for the set of workloads to a set of load identifiers (IDs) for the set of workloads. The apparatus may also store, based on the conversion of the information, the set of load IDs for the set of workloads in an alias table. Additionally, the apparatus may identify a locality of each of the set of workloads corresponding to the set of data threads, where the locality of each of the set of workloads is associated with an access pattern of at least one cache line of a cache for each of the set of workloads. The apparatus may also configure locality information associated with a locality of each of the first set of workloads in the set of workloads that correspond to the first set of data threads in the set of data threads. Moreover, the apparatus may determine whether to configure or store the locality information associated with the locality of each of the at least one second set of workloads. The apparatus may also store, based on the locality of each of the set of workloads, the access pattern of the at least one cache line for a first set of workloads in the set of workloads, where the first set of workloads corresponds to a first set of data threads in the set of data threads. The apparatus may also store, or refrain from storing, data for at least one second set of workloads in the set of workloads based on the access pattern of the at least one cache line for the first set of workloads. The apparatus may also output an indication of the storage, or the refrainment from storage, of the data for the at least one second set of workloads.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 9 is a diagram illustrating an example of a graph depicting data locality types for different GPU workloads.

FIG. 12 is a diagram illustrating an example of a cache management scheme.

FIG. 15 is a flowchart of an example method of data processing.

DETAILED DESCRIPTION

Figure 1:
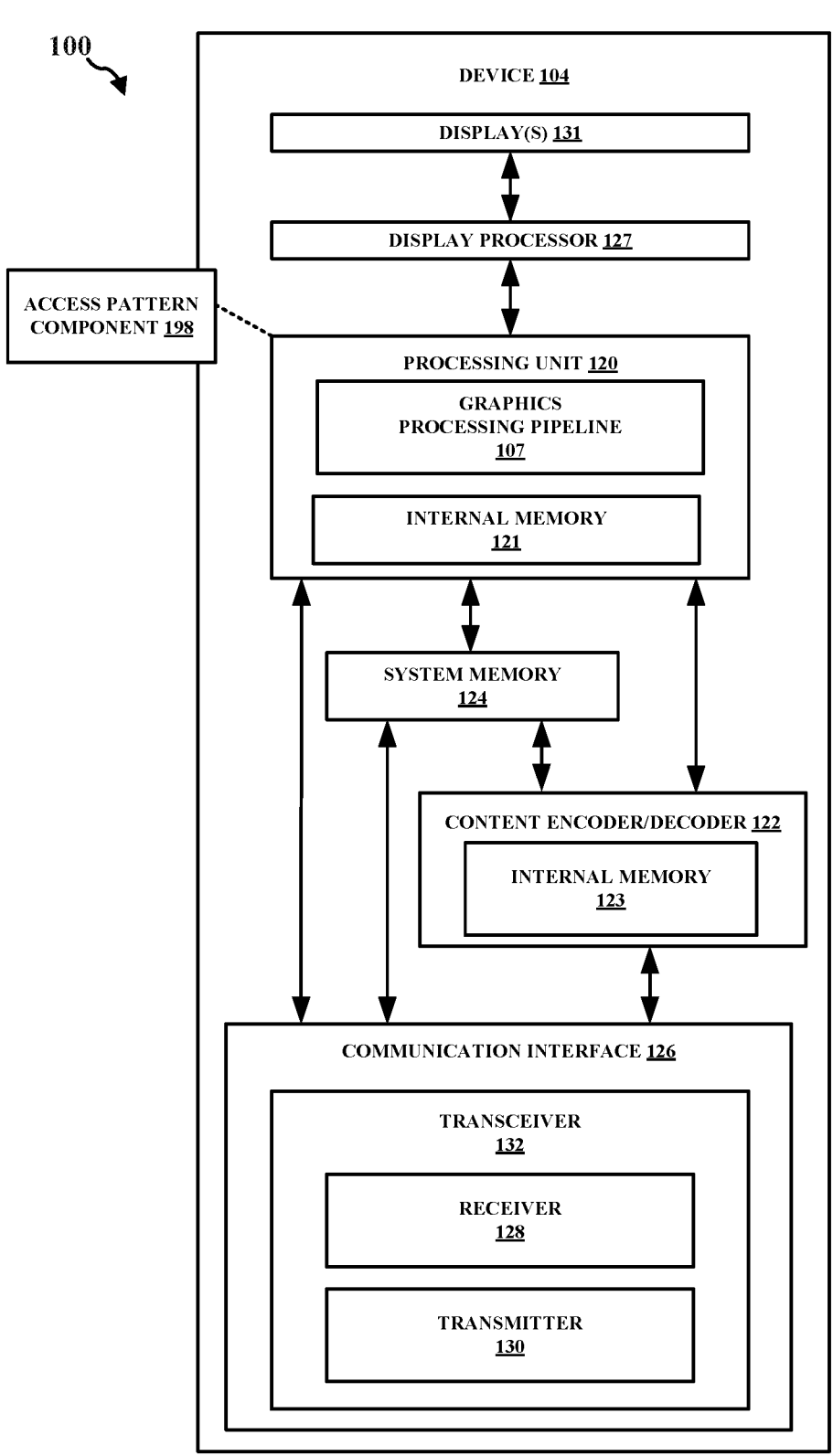
FIG. 1 is a block diagram that illustrates an example content generation system.

In some aspects, the increased latency of memory operations may be a prominent performance bottleneck in graphics processing units (GPUs). The first level (L1) data cache (L1D$) (e.g., a data cache where the global data structures are saved) that is shared across dozens of warps (i.e., a collection of threads) may create a significant cache contention, as well as premature data eviction. In some per-warp cache management schemes, cache space may be wasted by streaming (e.g., brought into cache not to be used later) data in active warps. Similarly, warp-level cache bypassing schemes, which are used to reduce inter-warp interference induced evictions, may also not be ideal, as any load instruction that exhibits strong temporal locality may also be forced to bypass the cache if the loads are issued from bypassing warps. Accordingly, it may be beneficial to utilize a cache management scheme that based on per-load locality behavior. Also, in some GPU applications, each global load instruction may have stable behavior during the entire application execution time. Namely, whether a load instruction benefits from warp throttling or benefits from cache bypassing may be independent of the warp ID or when that load is executed in the code. This property may be based on the GPU's unique software execution model where all warps originate from the same kernel code. Hence, cache-desired properties of a load, such as data locality types or cache sensitivity of a certain load instruction detected in one warp, may be widely applied to the same load execution in all other warps. So there may be an inefficient use of GPU caches if there is a lack of determining the locality of each workload. Aspects of the present disclosure may execute workloads (e.g., workloads at a GPU) based on a locality of each workload. For instance, aspects of the present disclosure may detect a locality of each workload at a GPU.

Aspects of the present disclosure may include a number of benefits or advantages. For instance, aspects of the present disclosure may utilize a cache (e.g., an L1 data cache) or bypass utilizing a cache based on a detection of a locality of a workload. Based on this, aspects of the present disclosure may efficiently utilize of GPU caches, as the use of GPU caches may be optimized. Aspects presented herein may utilize a cache management scheme that efficiently uses GPU caches based on the locality of each workload. More precisely, aspects presented herein may utilize a cache management scheme that based on per-load locality behavior. For example, aspects presented herein may identify or detect a locality of each of a set of workloads corresponding to data threads. Further, aspects presented herein may determine and store an access pattern of a cache line for a first set of workloads. By doing so, aspects presented herein may store data for at least one second set of workloads based on the access pattern of the cache line for the first set of workloads. Additionally, aspects presented herein may bypass (i.e., refrain from storing) data for at least one second set of workloads based on the access pattern of the cache line for the first set of workloads. By optimizing when data is stored in a cache (or bypassed from being stored in the cache), aspects presented herein may help to optimize the processing speed of GPUs, the amount of memory utilized by GPUs, and/or the amount of power utilized by GPUs.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/ or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/ decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include an access pattern component 198 configured to obtain an indication of a set of data threads associated with graphics processing, where the set of data threads corresponds to a set of workloads. The access pattern component 198 may also be configured to convert information associated with a load program counter (PC) for the set of workloads to a set of load identifiers (IDs) for the set of workloads. The access pattern component 198 may also be configured to store, based on the conversion of the information, the set of load IDs for the set of workloads in an alias table. The access pattern component 198 may also be configured to identify a locality of each of the set of workloads corresponding to the set of data threads, where the locality of each of the set of workloads is associated with an access pattern of at least one cache line of a cache for each of the set of workloads. The access pattern component 198 may also be configured to configure locality information associated with a locality of each of the first set of workloads in the set of workloads that correspond to the first set of data threads in the set of data threads. The access pattern component 198 may also be configured to determine whether to configure or store the locality information associated with the locality of each of the at least one second set of workloads. The access pattern component 198 may also be configured to store, based on the locality of each of the set of workloads, the access pattern of the at least one cache line for a first set of workloads in the set of workloads, where the first set of workloads corresponds to a first set of data threads in the set of data threads. The access pattern component 198 may also be configured to store, or refrain from storing, data for at least one second set of workloads in the set of workloads based on the access pattern of the at least one cache line for the first set of workloads. The access pattern component 198 may also be configured to output an indication of the storage, or the refrainment from storage, of the data for the at least one second set of workloads. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
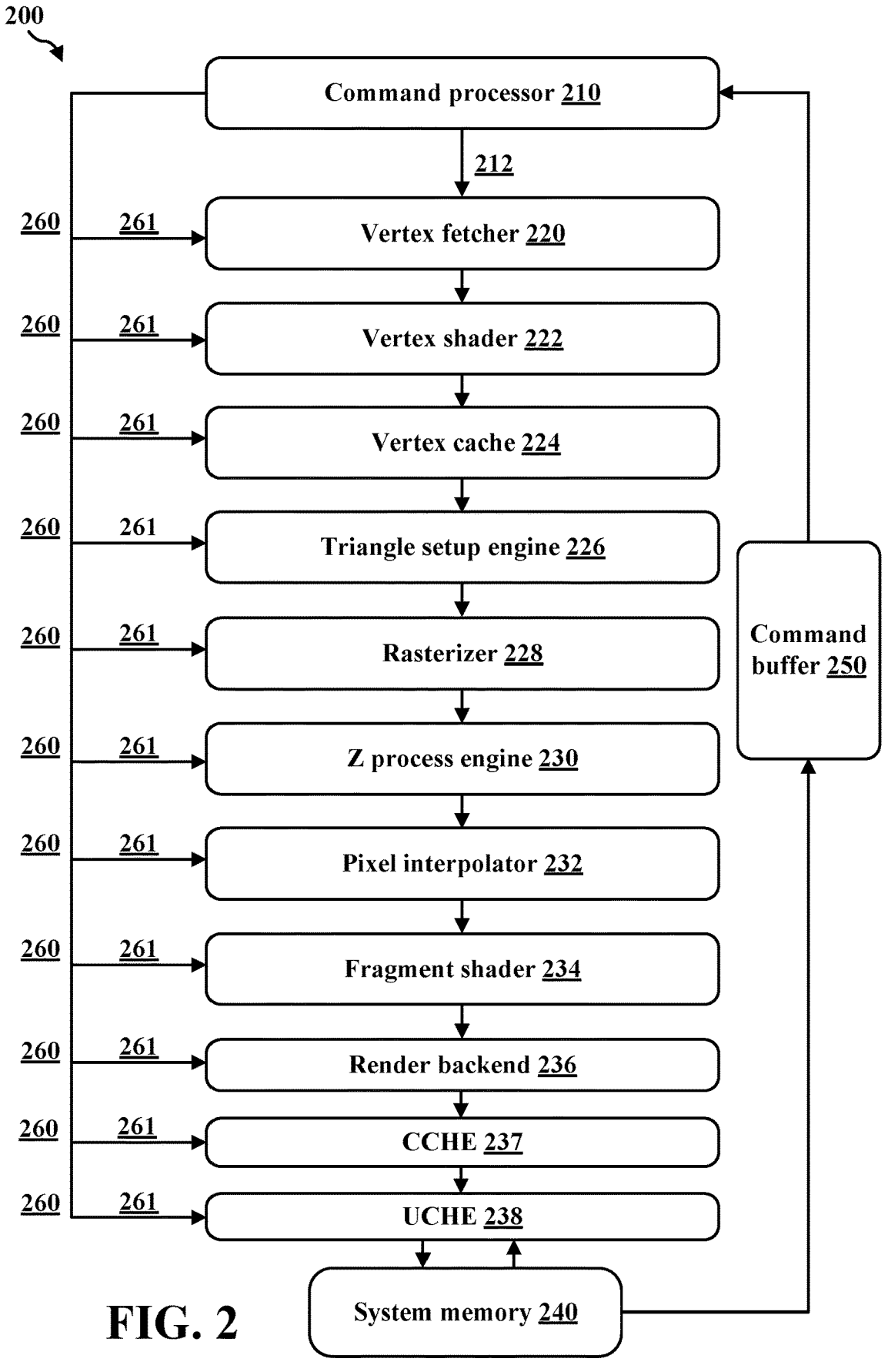
FIG. 2 illustrates an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 1 (L1) cache (cluster cache (CCHE)) 237, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some types of GPUs may include different types of pipelines, such as a graphics processing pipeline. Graphics processing pipelines may include one or more of a vertex shader stage, a hull shader stage, a domain shader stage, a geometry shader stage, and a pixel shader stage. These stages of the graphics processing pipeline may be considered shader stages. These shader stages may be implemented as one or more shader programs that execute on shader units at a GPU. Shader units may be configured as a programmable pipeline of processing components. In some examples, a shader unit may be referred to as "shader processors" or "unified shaders," and may perform geometry, vertex, pixel, or other shading operations to render graphics. Shader units may include shader processors, each of which may include one or more components for fetching and decoding operations, one or more arithmetic logic units (ALUs) for carrying out arithmetic calculations, one or more memories, caches, and registers.

Figure 3:
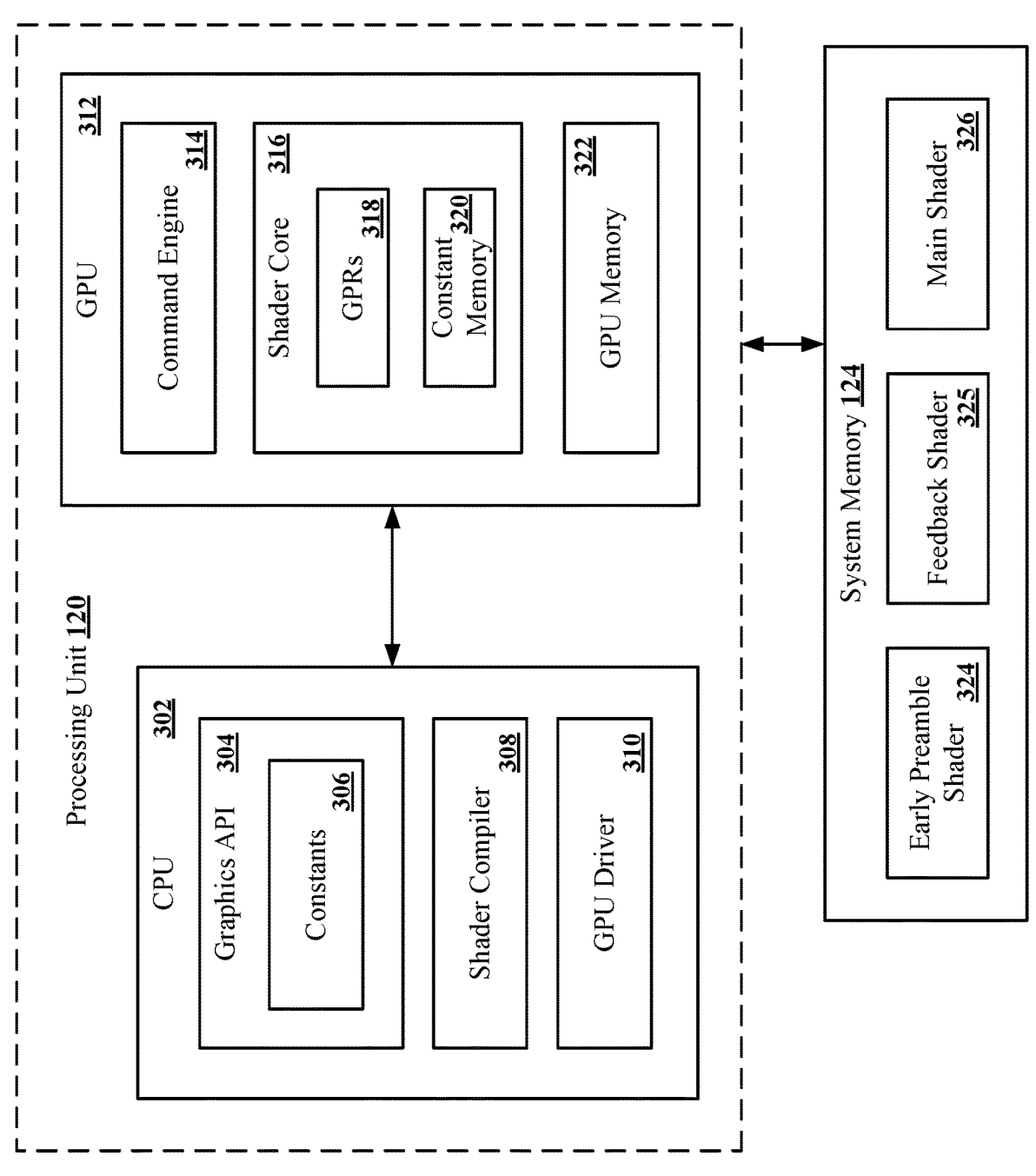
FIG. 3 is a diagram illustrating example processing components.

FIG. 3 is a diagram 300 that illustrates processing components, such as the processing unit 120 and the system memory 124, as may be identified in connection with the device 104 for processing data. In aspects, the processing unit 120 may include a CPU 302 and a GPU 312. The GPU 312 and the CPU 302 may be formed as an integrated circuit (e.g., a system-on-a-chip (SOC)) and/or the GPU 312 may be incorporated onto a motherboard with the CPU 302. Alternatively, the CPU 302 and the GPU 312 may be configured as distinct processing units that are communicatively coupled to each other. For example, the GPU 312 may be incorporated on a graphics card that is installed in a port of the motherboard that includes the CPU 302.

The CPU 302 may be configured to execute a software application that causes graphical content to be displayed (e.g., on the display(s) 131 of the device 104) based on one or more operations of the GPU 312. The software application may issue instructions to a graphics application program interface (API) 304, which may be a runtime program that translates instructions received from the software application into a format that is readable by a GPU driver 310. After receiving instructions from the software application via the graphics API 304, the GPU driver 310 may control an operation of the GPU 312 based on the instructions. For example, the GPU driver 310 may generate one or more command streams that are placed into the system memory 124, where the GPU 312 is instructed to execute the command streams (e.g., via one or more system calls). A command engine 314 included in the GPU 312 is configured to retrieve the one or more commands stored in the command streams. The command engine 314 may provide commands from the command stream for execution by the GPU 312. The command engine 314 may be hardware of the GPU 312, software/firmware executing on the GPU 312, or a combination thereof. While the GPU driver 310 is configured to implement the graphics API 304, the GPU driver 310 is not limited to being configured in accordance with any particular API. The system memory 124 may store the code for the GPU driver 310, which the CPU 302 may retrieve for execution. In examples, the GPU driver 310 may be configured to allow communication between the CPU 302 and the GPU 312, such as when the CPU 302 offloads graphics or non-graphics processing tasks to the GPU 312 via the GPU driver 310.

The system memory 124 may further store source code for one or more of an early preamble shader 324, a feedback shader 325, or a main shader 326. In such configurations, a shader compiler 308 executing on the CPU 302 may compile the source code of the shaders 324-326 to create object code or intermediate code executable by a shader core 316 of the GPU 312 during runtime (e.g., at the time when the shaders 324-326 are to be executed on the shader core 316). In some examples, the shader compiler 308 may pre-compile the shaders 324-326 and store the object code or intermediate code of the shader programs in the system memory 124. The shader compiler 308 (or in another example the GPU driver 310) executing on the CPU 302 may build a shader program with multiple components including the early preamble shader 324, the feedback shader 325, and the main shader 326. The main shader 326 may correspond to a portion or the entirety of the shader program that does not include the early preamble shader 324 or the feedback shader 325. The shader compiler 308 may receive instructions to compile the shader (s) 324-326 from a program executing on the CPU 302. The shader compiler 308 may also identify constant load instructions and common operations in the shader program for including the common operations within the early preamble shader 324 (rather than the main shader 326). The shader compiler 308 may identify such common instructions, for example, based on (presently undetermined) constants 306 to be included in the common instructions. The constants 306 may be defined within the graphics API 304 to be constant across an entire draw call. The shader compiler 308 may utilize instructions such as a preamble shader start to indicate a beginning of the early preamble shader 324 and a preamble shader end to indicate an end of the early preamble shader 324. Similar instructions may be used for the feedback shader 325 and the main shader 326. The feedback shader 325 will be described in further detail below.

The shader core 316 included in the GPU 312 may include general purpose registers (GPRs) 318 and constant memory 320. The GPRs 318 may correspond to a single GPR, a GPR file, and/or a GPR bank. Each GPR in the GPRs 318 may store data accessible to a single thread. The software and/or firmware executing on GPU 312 may be a shader program 324-326, which may execute on the shader core 316 of GPU 312. The shader core 316 may be configured to execute many instances of the same instructions of the same shader program in parallel. For example, the shader core 316 may execute the main shader 326 for each pixel that defines a given shape. The shader core 316 may transmit and receive data from applications executing on the CPU 302. In examples, constants 306 used for execution of the shaders 324-326 may be stored in a constant memory 320 (e.g., a read/write constant RAM) or the GPRs 318. The shader core 316 may load the constants 306 into the constant memory 320. In further examples, execution of the early preamble shader 324 or the feedback shader 325 may cause a constant value or a set of constant values to be stored in on-chip memory such as the constant memory 320 (e.g., constant RAM), the GPU memory 322, or the system memory 124. The constant memory 320 may include memory accessible by all aspects of the shader core 316 rather than just a particular portion reserved for a particular thread such as values held in the GPRs 318.

Figure 4:
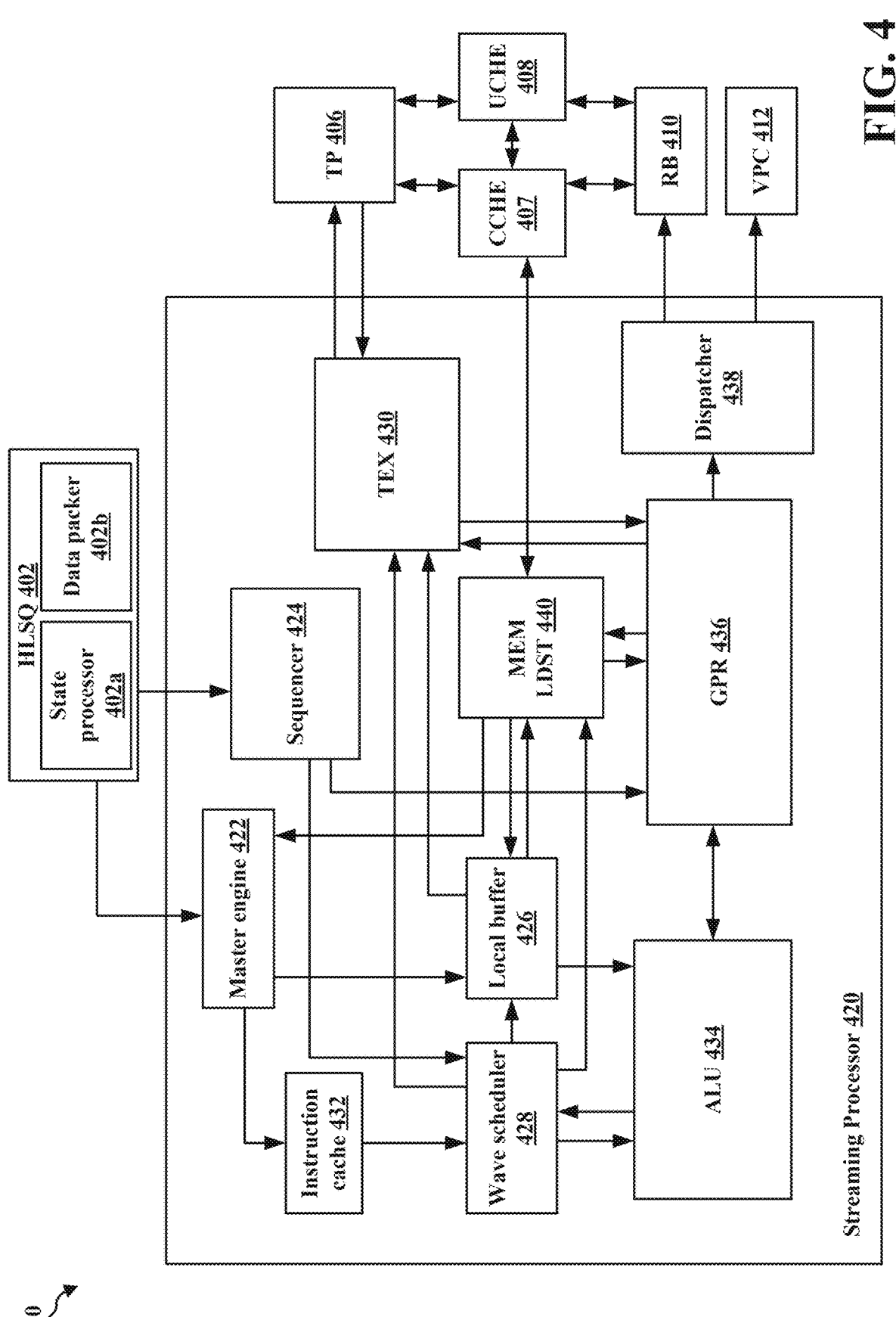
FIG. 4 is a diagram illustrating an example GPU.

FIG. 4 illustrates an example GPU 400. Specifically, FIG. 4 illustrates a streaming processor (SP) system in GPU 400. As shown in FIG. 4, GPU 400 includes a high level sequencer (HLSQ) 402, texture processor (TP) 406, level 1 (L1) cache (cluster cache (CCHE)) 407, level 2 (L2) cache (UCHE) 408, render backend (RB) 410, and vertex cache (VPC) 412. GPU 400 also includes SP 420, master engine 422, sequencer 424, local buffer 426, wave scheduler 428, texture (TEX) 430, instruction cache 432, arithmetic logic unit (ALU) 434, GPR 436, dispatcher 438, and memory (MEM) load store (LDST) 440.

As shown in FIG. 4, each unit or block in GPU 400 may send data or information to other blocks. For instance, HLSQ 402 may send commands to the master engine 422. Also, HLSQ 402 may send vertex threads, vertex attributes, pixel threads, pixel attributes, and/or compute commands to the sequencer 424. TP 406 may receive texture requests from TEX 430, and send texture elements (texels) back to the TEX 430. Further, TP 406 may send memory read requests to and receive memory data from CCHE 407 or UCHE 408. CCHE 407 or UCHE 408 may also receive memory read or write requests from MEM LDST 440 and send memory data back to MEM LDST 440, as well as receive memory read or write requests from RB 410 and send memory data back to RB 410. Also, RB 410 may receive an output in the form of color from GPR 436, e.g., via dispatcher 438. VPC 412 may also receive output in the form of vertices from GPR 436, e.g., via dispatcher 438. GPR 436 may send address data or receive write back data from MEM LDST 440. GPR 436 may also send temporary data to and receive temporary data from ALU 434. Moreover, ALU 434 may send address or predicate information to the wave scheduler 428, as well as receive instructions from wave scheduler 428. Local buffer 426 may send constant data to ALU 434. TEX 430 may also receive texture attributes from or send texture data to GPR 436, as well as receive constant data from local buffer 426. Further, TEX 430 may receive texture requests from wave scheduler 428, as well as receive constant data from local buffer 426. MEM LDST 440 may send/receive constant data to/from local buffer 426. Sequencer 424 may send wave data to wave scheduler 428, as well as send data to GPR 436. The sequencer 424 may allocate resources and local memory. Also, the sequencer 424 may allocate wave slots and any associated GPR 436 space. For example, the sequencer 424 may allocate wave slots or GPR 436 space when the HLSQ 402 issues a pixel tile workload to the SP 420. Master engine 422 may send program data to instruction cache 432, as well as send constant data to local buffer 426 and receive instructions from MEM LDST 440. Instruction cache 432 may send instructions or decode information to wave scheduler 428. Wave scheduler 428 may send read requests to local buffer 426, as well as send memory requests to MEM LDST 440.

As further shown in FIG. 4, the HLSQ 402 may prepare one or more context states for the SP 420. For example, the HLSQ 402 may prepare the context states for different types of data, e.g., global register data, shader constant data, buffer descriptors, instructions, etc. Additionally, the HLSQ 402 may embed context states into a command stream to the SP 420. The master engine 422 may parse the command stream from the HLSQ 402 and setup an SP global state. Moreover, the master engine 422 may fill or add to an instruction cache 432 and/or a local buffer 426 or a constant buffer. In some aspects, inside the HLSQ 402, there may be an internal function unit called a state processor 402*a*. The state processor 402*a* may be a single fiber scalar processor that may execute a special shader program, e.g., a preamble shader. The preamble shader may be generated by the GPU compiler in order to load constant data from different buffer objects. Also, the preamble shader may bind the buffer objects into a single constant buffer, such as a post-process constant buffer. Further, the HLSQ 402 may execute the preamble shader and, as a result, skip utilizing a main shader. In some instances, the main shader may perform different shading tasks, such as normal vertex shading and/or a fragment shading program. Moreover, the HLSQ 402 may include a data packer 402*b*.

Additionally, as shown in FIG. 4, the SP 420 may not be limited to executing a preamble if the HLSQ 402 decides to skip a preamble execution. For instance, the SP 420 may also process a conventional graphics workload, such as vertex shading and/or fragment shading. In some aspects, the SP 420 may utilize its execution units and storage in order to process compute tasks as a general purpose GPU (GPGPU). Inside the SP 420, there may be multiple parallel instruction execution units such as an ALU, elementary function unit (EFU), branching unit, TEX, general memory read and write (aka LDST), etc. The SP 420 may also include on-chip storage memory, such as a GPR 436 which may store per-fiber private data. Also, the SP 420 may include a local buffer 426 which stores per-shader or per-kernel constant data, per-wave uniform data (aka uGPR), and per-compute work group (WG) local memory (LM).

Processing a preamble shader may take up one wave slot. Further, the majority of preamble shaders may use just the uGPR and not the GPR, and may execute ALU instructions on a scalar ALU. Therefore, execution of the preamble shader may be associated with high performance, and may be power efficient because any available wave slot may be used to execute the preamble shader even without GPR space allocation.

Moreover, as shown in FIG. 4, dispatcher 438 may fetch data from GPR 436. Dispatcher 438 may also perform format conversion, and then dispatch a final color to multiple render targets (RTs). Each RT may have one or more components, such as red (r) green (G) blue (B) alpha (A) (RGBA) data, or just an alpha component of the RGBA data. Further, each RT may be generally stored in a vector GPR, i.e., R3.0 may store red data, R3.1 may store green data, R3.2 may store blue data, etc. Also, a driver program in an SP context register may be utilized to define the GPR identifier (ID) which stores RT data.

Figure 5:
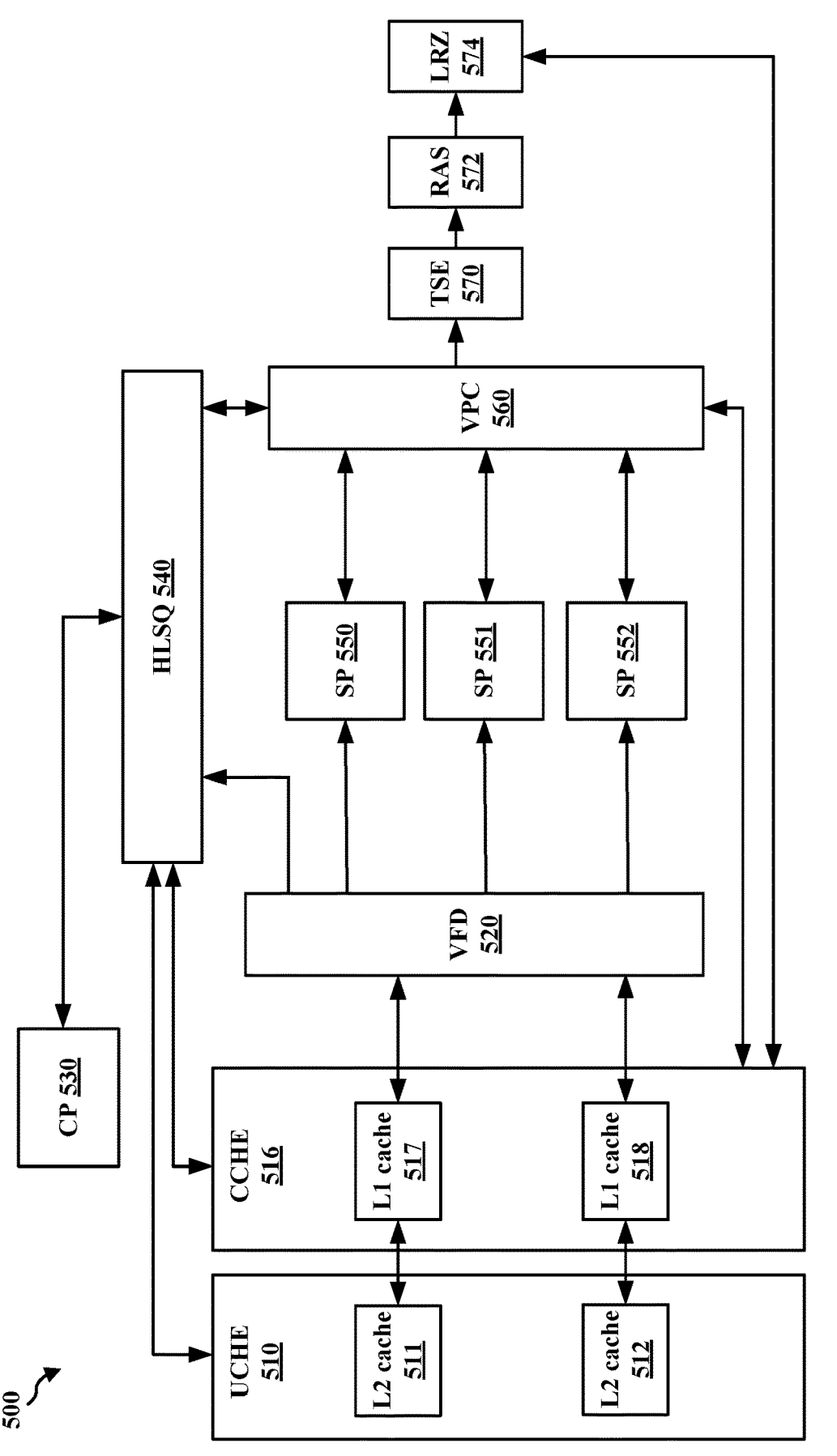
FIG. 5 is a diagram illustrating an example GPU.

FIG. 5 is a diagram illustrating another example GPU. More specifically, FIG. 5 depicts GPU 500 including a number of different components. As shown in FIG. 5, GPU 500 includes UCHE 510 including L2 cache 511 and L2 cache 512, CCHE 516 including L1 cache 517 and L1 cache 518, VFD 520, CP 530, HLSQ 540, a number of SPs (e.g., SP 550, SP 551, and SP 552), VPC 560, TSE 570, RAS 572, and low resolution Z (LRZ) component (e.g., LRZ 574). As shown in FIG. 5, CP 530 may transmit data to HLSQ 540 and receive data from HLSQ 540. CCHE 516 may transmit/receive data to/from HLSQ 540. UCHE 510 may also transmit/receive data to/from HLSQ 540. L2 cache 511 and L2 cache 512 may transmit/receive data to/from VFD 520. Further, VFD 520 may transmit data to HLSQ 540, as well as transmit data to SPs 550-552. Moreover, SPs 550-552 may transmit/receive data to/from VPC 560. Also, VPC 560 may transmit/receive data to/from HLSQ 540. Data can also be transmitted from VPC 560 to TSE 570, which can transmit data to RAS 572, and then to LRZ 574. CCHE 516 can transmit/receive data to/from VPC 560 and LRZ 574. Also, UCHE 510 can transmit/receive data to/from VPC 560 and LRZ 574.

As depicted in FIG. 5, GPUs (e.g., GPU 500) may include a number of different caches. GPUs utilize caches for a variety of reasons, such as to transfer data at a sufficiently high rate of speed. That is, as processing power for GPUs has increased at a higher rate than memory access speed, storage resources (e.g., caches) between the processor and memory have been utilized to transfer data at a sufficient rate. Caches at GPUs are also utilized to more seamlessly transfer data. One benefit of caches is that they provide buffering, so caches and buffers may be similar. For instance, caches may decrease latency by reading data from memory in larger chunks based on subsequent data accessing nearby address locations. Also, caches may increase throughput by assembling multiple small transfers into larger, more efficient memory requests. These benefits may be achieved by a cache storing data in blocks called cache lines. A cache line may be a portion of data that can be mapped into a cache. For example, a cache line may be a smallest portion of data that can be mapped into a cache.

In some aspects, each mapped cache line may be associated with a block (e.g., a core line), which is a corresponding region on a main memory or a backend storage). A backend storage may allow performance for the cache and GPU to improve. For example, database caching may allow an increased throughput and a reduced data retrieval latency associated with backend databases, which may improve the overall performance of the cache and GPU. Also, in some aspects, both the cache and main memory/backend storage may be divided into blocks of the size of a cache line. Further, all the cache mappings may be aligned to these blocks. Cache lines may have a certain size (e.g., between 32 to 512 bytes), and memory transactions may be performed in units of cache lines. Individual cache accesses made by code that executes on a GPU processor may be smaller than these units of cache lines (e.g., 4 bytes).

Figure 6:
FIG. 6 is a diagram illustrating an example mapping of a cache.

FIG. 6 is a diagram 600 illustrating an example mapping of a cache. More specifically, FIG. 6 depicts a cache mapping 602 for a cache 610 and a main memory 620. That is, FIG. 6 depicts the relationship between cache lines in cache 610 (e.g., cache line 611, cache line 612, cache line 613, and cache line 614) and blocks in main memory 620 (e.g., block 621, block 622, block 623, block 624, block 625, block 626, block 627, and block 628). As shown in FIG. 6, diagram 600 illustrates that individual blocks 621-628 may be directly mapped to individual cache lines 611-614. For example, as illustrated in diagram 600, block 621 may be mapped to cache line 611, block 622 may be mapped to cache line 613, block 625 may be mapped to cache line 612, and block 626 may be mapped to cache line 614. Some of the blocks 621-628 may not be directly mapped to cache lines 611-614. For instance, block 623, block 624, block 627, and block 628 may not be directly mapped to cache lines 611-614. In some aspects, main memory 620 including blocks 621-628 may be a backend storage including a number of core lines.

In some caches, valid data (e.g., valid bits) and dirty data (e.g., dirty bits) may correspond to a current cache line state. For instance, when a cache line is valid (i.e., in a valid state) it may refer to the cache line being mapped to a block in main memory (e.g., a core line determined by a core identifier (ID) and a core line number). When a cache line is invalid (i.e., in an invalid state), it may be used to map a core line accessed by a certain request (e.g., an input/output (I/O) request), and the cache line may become valid thereafter. A cache line may return to an invalid state based on a number of different reasons. For example, a cache line may return to an invalid state: if the cache line is being evicted, if the core pointed to by the core ID is being removed, if the core pointed to by the core ID is being purged, if the entire cache is being purged, during a discard operation being performed on a corresponding core line, or during a certain request (e.g., an I/O request) when a cache mode which may perform an invalidation is selected.

In some aspects, dirty data or modified data may refer to data that is associated with a block of memory and indicates whether the corresponding block of memory has been modified. For example, a dirty bit or modified bit may be a bit that is associated with a block of memory and indicates whether the corresponding block of memory has been modified. The dirty data (e.g., dirty bit) may be set when a processor writes to (i.e., modifies) this memory. For instance, the dirty data (e.g., dirty bit) may indicate that its associated block of memory has been modified and has not been saved to storage yet. That is, "dirty data" may refer to data in a cache that is modified, but the memory still has an old or stale copy of the data. In some instances, when a block of memory is to be replaced, its corresponding dirty data (e.g., dirty bit) may be checked to determine if the block may need to be written back to secondary memory before being replaced or if it can simply be removed. Moreover, dirty data (e.g., dirty bit) may determine if the cache line data stored in the cache is in synchronization with corresponding data on the backend storage. For instance, if a cache line is dirty, then data on the cache storage may be up to date, and the data may need to be flushed (i.e., removed) at some point in the future (e.g., after the flushing the data may be marked as clean by zeroing a dirty bit). Also, a cache line may be considered valid if at least one of its sectors is valid. Likewise, a cache line may be considered dirty if at least one of its sectors is dirty.

In some instances, a goal of caches (e.g., caches in GPUs or CPUs) may be to increase the performance of repeated accesses to the same data, as caches may keep a copy of a subset of the data in memory. Accordingly, subsequent accesses of the data already in the cache may not utilize an expensive memory access transaction. As some caches may have a smaller capacity than the memory size (e.g., a memory size of a GPU system), the currently-cached data set may continuously change. This continuously change in cached data may be due to the memory access pattern of the executed code and/or the data replacement policy of the cache. In some aspects, one goal of caches may be to maximize the cache hit rate (i.e., the percentage of data accesses that can be served from data in the cache). By maximizing the cache hit rate, the overall performance of the cache (e.g., cache at a GPU or CPU) may be increased. This performance improvement may be important for overall systems that include the cache (e.g., GPUs or CPUs), as the systems may serve numerous simultaneously running threads with data.

Caches may receive a number of requests (e.g., data or content requests) to store or cache data. A cache hit may refer to an event when data requested for processing (e.g., requested by a component or application) is successfully retrieved from the cache memory. For example, a cache hit may describe when data or content is successfully found in the cache. That is, a cache hit may be when a system or application makes a request to retrieve data from a cache, and the specific data is currently in cache memory. A cache miss may refer to an event when data requested for processing (e.g., requested by a component or application) is not successfully retrieved from the cache memory. For example, a cache miss may describe when data or content is not successfully found in the cache. That is, a cache miss may be when a system or application makes a request to retrieve data from a cache, but that specific data is not currently in cache memory. Caches may be measured based on an amount of data requests that the cache is able to successfully fill. A cache hit rate (i.e., hit rate or cache hit ratio) is a measurement of how many data requests a cache is able to successfully fill compared to a total number of data requests it receives. For instance, a cache hit rate (i.e., hit rate or cache hit ratio) is equal to the number of cache hits divided by the total number of data requests. As a formula, cache hit rate=(number of cache hits)/(number of cache hits+number of cache misses).

There are a number of different types of caches (e.g., caches that are utilized by GPUs or CPUs). For instance, there are fully-associative caches, direct-mapped caches, and set-associative cache. A fully-associative cache may utilize a least recently used (LRU) cache policy, where there are a number of cells (e.g., M cells) that are each capable of holding a cache line corresponding to any of the memory locations (e.g., N memory locations). In the case of cache contention, the cache line that is not accessed the longest may be kicked out and replaced with a new cache line. A direct-mapped cache may directly map a block of memory to a single cache line which it can occupy. A set-associative cache may divide the address space into equal groups, which separately act as small fully-associative caches.

A set indexing of a cache may refer to the size of the cache sets, or, i.e., how many different cache lines each data block can be mapped to. That is, the set indexing of a cache may refer to a number of cache lines that are associated with a cache set for the cache. Also, a set index (i.e., index) may be a portion of a cache address that identifies in which lines of the cache an address is found. A cache set may include the number of cache lines in the cache. An associativity of a cache may refer to the number of cache lines that are mapped to a set. That is, the associativity of a cache may refer to the number of multiple, different cache lines that are mapped to the same set. A higher associativity may result in a more efficient utilization of a cache, but may also increase the power/cost utilized by the cache. Likewise, a lower associativity may decrease the power/cost utilized by the cache, but may result in a less efficient utilization of the cache. The capacity of a cache may refer to the amount of data or information that can be stored in the cache. Additionally, the capacity or associativity of the cache may be adjusted based on a number of different factors (e.g., a cache hit rate). Further, a data allocation for a cache may be a manner in which data is allocated to a cache.

As caches may store and retrieve data from memory, in some instances, caches may experience memory latency. For instance, memory latency may be the time (i.e., latency) elapsed from an initial request for data until the data is actually retrieved. That is, memory latency may refer to time elapsed from an initiation of a request for a data (e.g., a byte or word) in memory until it is retrieved from the memory (e.g., retrieved from the memory by a processor). In comparison, memory latency measures a time elapsed to actually retrieve data from memory, while memory bandwidth measures a throughput of the memory. In some aspects, if the data is not in the memory or cache, it may take a longer period of time to obtain the data, thus resulting in an increased memory latency (e.g., the processor may have to communicate with external memory cells. For instance, memory latency may be a measure of the speed of the memory, such that a faster the reading operation will have a reduced memory latency and a slower the reading operation will have an increased memory latency. Memory latency may be expressed in different measurements of time (e.g., in actual time elapsed (such as ns) or clock cycles). Also, an average memory latency may refer to the average time elapsed from a request for data until the data is actually retrieved. The average memory latency may be calculated or determined based on an average of a number of data requests for a cache.

As mentioned herein, a cache may be utilized to store a variety of data or information (e.g., an address, some data, and some status information). A single cache may be used to store instructions and/or data (e.g., a unified cache). This type of cache may be referred to as an instruction cache (I-cache) and/or a data cache (D-cache). A "tag" may be a part of a memory address stored within a cache that identifies the main memory address associated with a line of data. For instance, the top bits of a memory address (e.g., a 64-bit address) may inform a cache where certain information came from in main memory (i.e., known as the tag). The total cache size may be a measure of the amount of data the cache can hold (e.g., random access memories (RAMs) used to hold tag values may not be included in the calculation). Additionally, the tag may take up physical space in the cache. In some aspects, it may be inefficient to store a small amount (e.g., one word) of data for each tag address, so several locations may be grouped together under the same tag. This type of logical block may be referred to as a cache line, which may refer to the smallest loadable unit of a cache (e.g., a block of contiguous words from main memory).

Additionally, a cache line may be valid when it contains cached data or instructions. Likewise, a cache line may be invalid when it does not contain cached data or instructions. Also, one or more status bits may be associated with each line of data. In some aspects, there may be a valid bit that marks the cache line as containing data that can be used. For instance, this may mean that the address tag represents some real value. In a data cache, there may be one or more dirty bits that denote whether the cache line (or part of the cache line) holds data that is not the same as (i.e., data that is newer than) the contents of main memory. Further, the data that is stored may correspond to a memory address (i.e., a location) in the cache. An "index" may be the portion of the memory address that identifies in which lines of the cache the address is found. For example, the index (e.g., the middle bits of the address) may identify the line. The index may also be used as an address for the cache RAMs and may not need storage as a part of the tag. A "way" may be a subdivision of a cache, where each way is an equal size and indexed in the same fashion. A "set" or "cache set" may include the cache lines from all of the ways that share a particular index. For instance, this may mean that the bottom few bits of the address (i.e., the offset) may not be stored in the tag. In some instance, the address of an entire line may be utilized (i.e., not each byte within the line).

Figure 7:
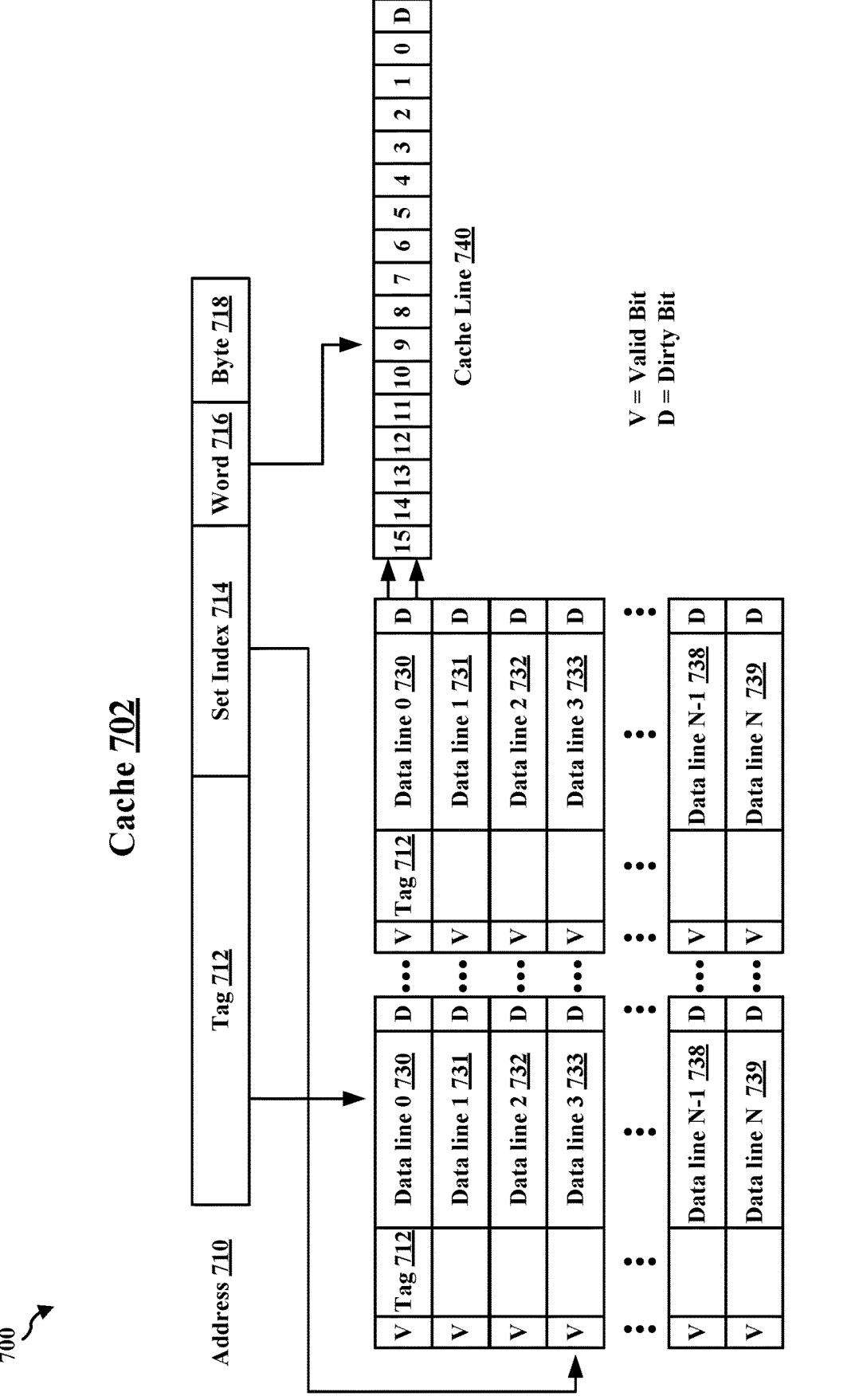
FIG. 7 is a diagram illustrating an example cache.

FIG. 7 is a diagram 700 illustrating an example address location mapping for a cache. More specifically, FIG. 7 depicts an example storage system for a cache. As shown in FIG. 7, diagram 700 of cache 702 (e.g., a set associative data cache) depicts address 710 including tag 712, set index 714, word 716, byte 718, data line 730 (e.g., data line 0), data line 731 (e.g., data line 1), data line 732 (e.g., data line 2), data line 733 (e.g., data line 3), data line 738 (e.g., data line N−1 or a $254^{th}$ data line), data line 739 (e.g., data line N or a $255^{th}$ data line), and cache line 740. FIG. 7 depicts that tag 712 is a part of address 710 within cache 702 that identifies the main memory address associated with a line of data. Set index 714 (i.e., index) is the portion of address 710 that identifies in which lines of the cache 702 an address is found. For example, FIG. 7 shows that there are N lines of data (e.g., 256 lines of data) in cache 702, so set index 714 identifies in which lines (e.g., lines 0-256) a certain address is found. Set index 714 may map to all data lines 730-739. Diagram 700 also shows that word 716 corresponds to the cache line 740. Moreover, FIG. 7 shows valid bits (i.e., represented by "V" in FIG. 7) and dirty bits (i.e., represented by "D" in FIG. 7) in cache 702. As shown in FIG. 7, data line 738 (e.g., data line N−1) and data line 739 (e.g., data line N) depict that cache 702 may be an N-way associative cache.

Figure 8:
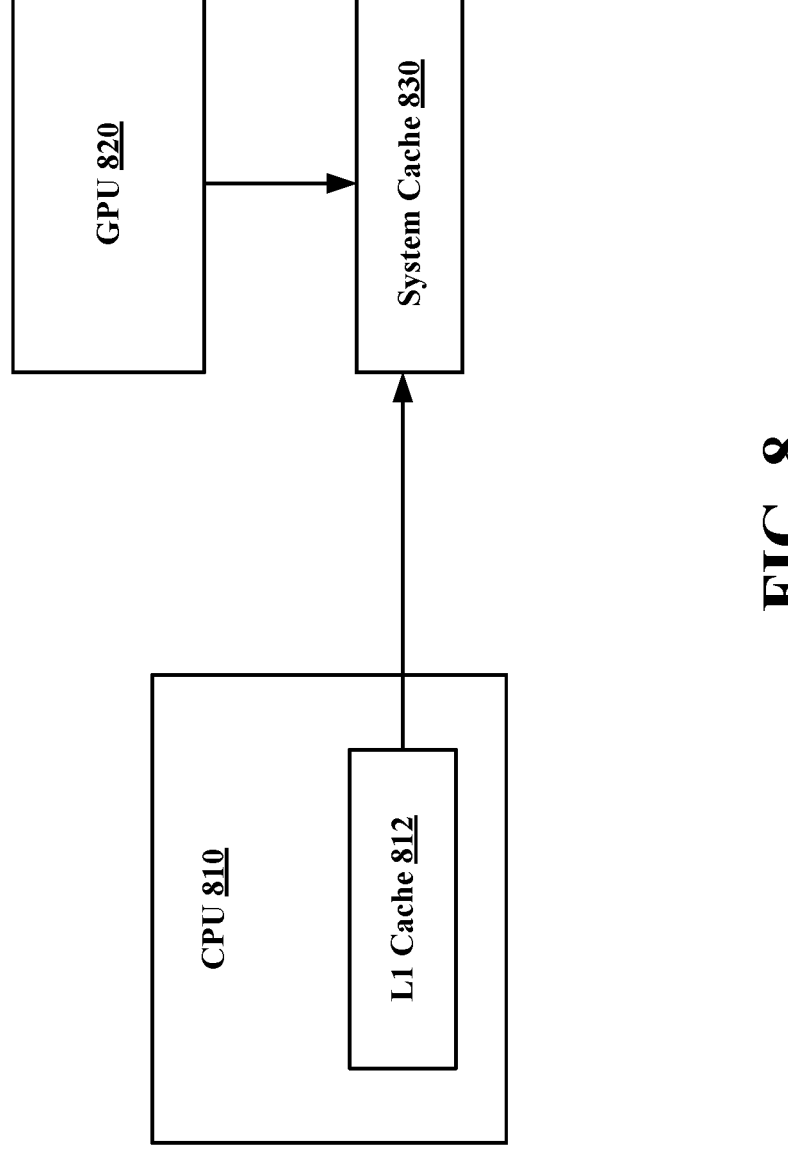
FIG. 8 is a diagram illustrating an example cache architecture.

FIG. 8 is a diagram 800 illustrating an example cache architecture. More specifically, FIG. 8 depicts an example architecture for a system cache and a layer 1 (L1) cache. As shown in FIG. 8, diagram 800 includes CPU 810 including L1 cache 812, GPU 820, and system cache 830. FIG. 8 depicts that CPU 810 may send information to system cache 830. For example, L1 cache 812 may send information to system cache 830. Also, GPU 820 may send information to system cache 830. As depicted in FIG. 8, the associativity of L1 cache 812 and/or system cache 830 may be limited due to the timing of information being transferred to/from CPU 810 and/or GPU 820. Additionally, as shown in FIG. 8, the associativity of L1 cache 812 and/or system cache 830 may be limited due to the power utilized by CPU 810 and/or GPU 820.

Some aspects of graphics processing may utilize certain GPU architectures and/or application structures. For instance, aspects of graphics processing may utilize a general purpose GPU (GPGPU) architecture that includes symmetric multiprocessor (SMs), shared cores, an interconnect unit, a dynamic random access memory (DRAM), and/or a number of different caches (e.g., a first level (L1) cache, a second level (L2) cache, and/or a last level cache (LLC)). In some instances of GPU architectures, a number of SMs, shared cores, and L1 caches may be connected to an interconnect unit. The interconnect unit may be connected to L2 caches and DRAMs. Additionally, in an application structure, an application may include a number of kernels, and each of the kernels may include concurrent thread arrays (CTAs), where each CTA includes a number of warps.

As indicated herein, a kernel may be a programming operations manager or a programming thread at a GPU. Also, a kernel may be executed in parallel by an array of threads, where all threads may run the same code. Each thread may have an identifier (ID) that it uses to compute memory addresses and make control decisions. A warp may be a collection of threads (e.g., 32 threads) that are executed simultaneously by a symmetric multiprocessor (SM). A warp may be a basic unit of execution, where multiple warps may be executed on an SM at once. When a program on a CPU invokes a kernel grid, the blocks of the grid may be enumerated and distributed to SMs with available execution capacity. The threads of a thread block may execute concurrently on one SM, and multiple thread blocks may execute concurrently on one SM. As thread blocks terminate, new blocks are launched on the vacated SMs. The mapping between warps and thread blocks may affect the performance of the kernel. Also, a clock or GPU clock may be a logical beat or time that is used to synchronize actions of the GPU. A clock source may manage how a GPU component derives its clock. A symmetric multiprocessor (SM) may be single instruction multiple thread processor which has multiple shared cores (e.g., shader processors (SPs)) for integer processing, special functional units (SFUs) (e.g., for calculating functions such as sine, cosine, root mean-squared (RMS), etc.). The SM may have load store (LD/ST) units for load and store into memory/registers. The SM may also have L1 caches, shared caches and large-banked register files. A concurrent thread array (CTA) may be a basic workload unit assigned to an SM in a GPU. Threads in a CTA may be sub-grouped into a warp/wavefronts, which is the smallest execution unit sharing the same program counter. A last level cache (LLC) may be a last level of cache from a GPUs context, such as an extended cache for SMs. An interconnect unit may be a crossbar switch which does multi-master arbitration, by which GPUs are connected to rest of the world. Further, a pointer of serialization/pointer of coherence (PoS/PoC) may be point in the system-on-chip (SoC) post where every master in the system may see the same coherent copy of data.

Also, some types of graphics processing may utilize a data locality pattern in GPU workloads. For instance, there may be a locality exhibited by data fetched from each warp load instruction. The locality exhibited by data fetched from each warp load instruction may be broadly classified into four types: streaming locality, inter-warp locality, intra-warp locality, and inter+intra-warp locality. Streaming data is brought into the data cache on a demand fetch, but may never be reused. Hence, it has zero temporal locality. If the data fetched by a load instruction from one warp is also accessed by the same load program counter (PC) across multiple warps, it may be defined as inter-warp locality. If the data fetched by a load instruction from one warp is exclusively used within the same warp, the data may exhibit intra-warp locality. Also, inter+intra-warp locality is when data is brought into a cache by one warp and then repeatedly re-referenced by other warps, as well as the original warp. A locality for each workload may be a reusability of an address or time associated with the cache (e.g., how close the next cache access is compared to the previous cache access), which may include a spatial locality and/or a temporal locality. A spatial locality may be associated with a reusability of an address of the cache (e.g., how close the next cache access is in location compared to the previous cache access in location). A temporal locality is associated with a reusability of a time for accessing the cache (e.g., how close the next cache access is in time compared to the previous cache access in time).

FIG. 9 illustrates diagram 900 including one example of a graph depicting data locality types at a GPU. More specifically, diagram 900 depicts a graph 902 of data locality types for different GPU workloads. As shown in FIG. 9, diagram 900 includes a number of data locality types including streaming locality 910, inter-warp locality 920, intra-warp locality 930, and inter+intra-warp locality 940. FIG. 9 also depicts a number of cache-sensitive (CS) workloads 950, cache-moderate (CM) workloads 960, and cache-insensitive (CI) workloads 970. The cache-sensitive workloads 950 include a breadth-first search (BFS) workload, a K-means (KMN) workload, an inverted index (IIX) workload, a word count (WC) workload, a graph coloring (GC) workload, and a single-source shortest path (SSP) workload. The cache-moderate workloads 960 include a sparse-matrix dense-vector multiplication (SPMV) workload, a matrix multiplication (MM) workload, a similarity score (SS) workload, and a connected component labeling (CCL) workload. Also, the cache-insensitive workloads 970 include a Gaussian elimination (GE) workload, a speckle reducing anisotropic diffusion (SRD) workload, a magnetic resonance imaging-gridding (MRI) workload, a register-titled matrix-matrix multiplication (SGM) workload, a stencil two-dimensional (2D) workload, and an all pairs shortest path (APS) workload. That is, FIG. 9 shows the representative GPU workloads which are known to be cache-sensitive workloads 950, cache-moderate workloads 960, and cache-insensitive workloads 970 and categorize them into data-locality patterns (e.g., streaming locality 910, inter-warp locality 920, intra-warp locality 930, and inter+intra-warp locality 940).

In some aspects, the increased latency of memory operations may be a prominent performance bottleneck in graphics processing units (GPUs). The first level (L1) data cache (L1D$) (e.g., a data cache where the global data structures are saved) that is shared across dozens of warps (i.e., a collection of threads) may create a significant cache contention, as well as premature data eviction. In some per-warp cache management schemes, cache space may be wasted by streaming (e.g., brought into cache not to be used later) data in active warps. Similarly, warp-level cache bypassing schemes, which are used to reduce inter-warp interference induced evictions, may also not be ideal, as any load instruction that exhibits strong temporal locality may also be forced to bypass the cache if the loads are issued from bypassing warps. Accordingly, it may be beneficial to utilize a cache management scheme that based on per-load locality behavior. Also, in some GPU applications, each global load instruction may have stable behavior during the entire application execution time. Namely, whether a load instruction benefits from warp throttling or benefits from cache bypassing may be independent of the warp ID or when that load is executed in the code. This property may be based on the GPU's unique software execution model where all warps originate from the same kernel code. Hence, cache-desired properties of a load, such as data locality types or cache sensitivity of a certain load instruction detected in one warp, may be widely applied to the same load execution in all other warps. So there may be an inefficient use of GPU caches if there is a lack of determining the locality of each workload. Based on the above, it may be beneficial to execute workloads based on a locality of each workload. That is, it may be beneficial to detect a locality of each workload at a GPU. Also, it may also be beneficial to utilize a cache or bypass utilizing a cache based on the detection of the workload locality. Further, it may be beneficial to utilize a cache management scheme that efficiently uses GPU caches based on the locality of each workload.

Aspects of the present disclosure may execute workloads (e.g., workloads at a GPU) based on a locality of each workload. For instance, aspects of the present disclosure may detect a locality of each workload at a GPU. Aspects presented herein may utilize a cache (e.g., an L1 data cache) or bypass utilizing a cache based on the detection of the workload locality. By doing so, aspects of the present disclosure may efficiently utilize of GPU caches, as the use of GPU caches may be optimized. Indeed, aspects presented herein may utilize a cache management scheme that efficiently uses GPU caches based on the locality of each workload. That is, aspects presented herein may utilize a cache management scheme that based on per-load locality behavior. For example, aspects presented herein may identify or detect a locality of each of a set of workloads corresponding to data threads. Moreover, aspects presented herein may determine and store an access pattern of a cache line for a first set of workloads. Based on this, aspects presented herein may store data for at least one second set of workloads based on the access pattern of the cache line for the first set of workloads. Also, aspects presented herein may bypass (i.e., refrain from storing) data for at least one second set of workloads based on the access pattern of the cache line for the first set of workloads. By optimizing when data is stored in a cache (or bypassed from being stored in the cache), aspects presented herein may help to optimize the processing speed of GPUs, the amount of memory utilized by GPUs, and/or the amount of power utilized by GPUs.

Aspects presented herein may utilize certain types of a cache management schemes in order to detect the locality type of each workload. For instance, aspects presented herein may utilize a warp access pattern-aware cache (WAPC) management scheme, which may dynamically detect the locality type of each load instruction. That is, aspects presented herein by dynamically detect the locality type of each load instruction monitoring the accesses from one exemplary warp. For example, aspects presented herein may utilize a warp access pattern-aware cache (WAPC) management scheme that utilizes the detected locality type to selectively apply cache bypassing and/or cache pinning of data based on load locality characterization. Thus, WAPC management schemes described herein may significantly improve GPU performance (e.g., improve GPU processing speed and/or reduce the amount of power utilized at the GPU). Also, exploiting a locality observation and combining that with GPU workload characteristics (e.g., where the load instruction that fetches a particular locality type of data may tend to fetch the same locality type of data for the entire kernel execution) may be a novel idea of warp access pattern-aware cache (WAPC) management schemes utilized herein.

In some aspects, in a GPU execution model, each kernel is executed by thousands of warps, where all the warps execute the same code. Aspects presented herein may use one of the running warps as a pilot warp for each kernel. The pilot warp may be one of the first running warps in each kernel. Also, the pilot warp may be used to collect an access-locality pattern for each kernel, which will be stored in a table (e.g., a locality history table or an alias table). This table may be used to refer the data-locality pattern for subsequent concurrent thread arrays (CTAs). The table may also be used to make cache management policy decisions like cache-bypassing, cache-line locking based on workload types (e.g., cache-sensitive (CS) workloads, cache-moderate (CM) workloads, and cache-insensitive (CI) workloads). In turn, this may help to boost the GPU performance due to curbing unnecessary evictions due to currently implemented cache policies (e.g., least recently used (LRU) policies in an L1 data cache (L1D$)). The cache management scheme may also perform a classification of kernel data access patterns without any performance overhead and/or a desire to be implemented into a load store (LD/ST) pipeline of each shader processor (SP). Aspects presented herein may also achieve a significant increase in instructions per clock (IPCs) due to the efficient cache management policies based on data access patterns.

Figure 10:
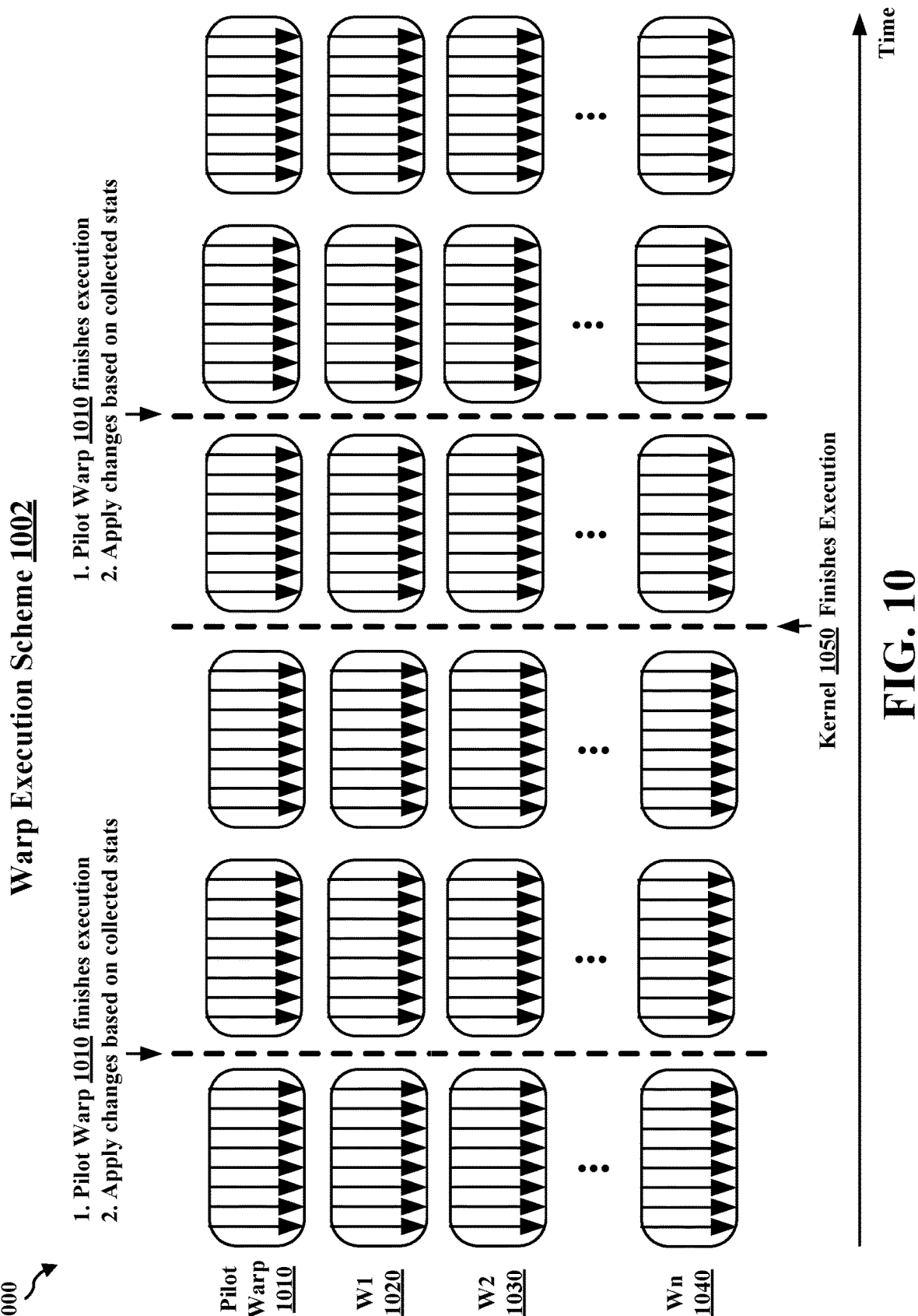
FIG. 10 is a diagram illustrating an example of a warp execution scheme.

FIG. 10 illustrates diagram 1000 including one example of an execution scheme. More specifically, diagram 1000 depicts warp execution scheme 1002. As shown in FIG. 10, warp execution scheme 1002 includes pilot warp 1010, first warp (W1) 1020, second warp (W2) 1030, nth warp (Wn) 1040, and kernel 1050. FIG. 10 depicts that after a certain time period, pilot warp 1010 finishes execution. After pilot warp 1010 finishes execution, aspects presented herein may apply changes based on collected statistics. Aspects presented herein may then execute a number of warps (e.g., pilot warp 1010, first warp (W1) 1020, second warp (W2) 1030, and nth warp (Wn) 1040). The kernel 1050 may then finish execution. After a certain time period, pilot warp 1010 finishes execution and aspects presented herein may apply changes based on collected statistics. Finally, aspects presented herein may again execute a number of warps (e.g., pilot warp 1010, first warp (W1) 1020, second warp (W2) 1030, and nth warp (Wn) 1040).

Aspects presented herein may utilize warp access pattern-aware cache (WAPC) management schemes including warp data locality. Warp access pattern-aware cache (WAPC) management schemes utilized herein may exploit the observation that each load exhibits a persistent data locality type to improve utilization of GPU caches (e.g., an L1 data cache). WAPC management schemes utilized herein may first detect a data locality type of each load instruction by monitoring cache access patterns for one exemplary warp. Since the data locality type may not be inferred from a regular cache due to severe interference in the cache from multiple warps, WAPC management schemes utilized herein may use a dedicated cache tag array to track data sharing behavior from one warp. The locality type inferred for each load in the pilot warp may then be applied for the same load across all warps within a kernel, as the cache access patterns may exhibit strong consistency among warps. WAPC management schemes utilized herein may then apply load-specific cache management schemes for each data locality type (e.g., streaming data locality, inter-warp locality, intra-warp locality, and/or inter-intra-warp locality).

In some aspects, streaming data locality may occupy a significant fraction of demanded data in cache-moderate (CM) and cache-insensitive (CI) workload applications. That means resources like cache lines and miss-status-holding-register (MSHR) entries may be wasted when streaming data is fetched into the cache. Also, even if there are a few cache lines with a strong locality in these applications, they may be evicted by the streaming data. Thus, the best way to treat streaming data may be to bypass the cache (e.g., L1 cache) entirely and provide data to compute cores directly from another cache (e.g., L2 cache) and its associated interconnection network. Additionally, a primary reason for inter-warp locality may be stride accesses to large data arrays across different warps. The index of the data array accessed by each thread may be computed using a linear function of thread identifiers (IDs) and/or CTA IDs threads' data addresses may be merged into one cache line space. However, coalesced requests may straddle two cache line regions if the addresses are misaligned. In that case, a single warp access may bring in two cache lines, but a part of second cache line may be accessed by the current warp. The neighboring warp may access the leftover data in the second cache line and then fetch a new cache line which may be partially used. Such misaligned data accesses may cause inter-warp sharing. Another reason for inter-warp locality is a small data request size. Even if threads' request addresses are merged, small data size (e.g., 1 byte per thread) may not occupy an entire cache line. Then the neighbor warps may consume the remaining part of the cache line space. In some instances, intra-warp locality may be a dominant type of locality for cache-sensitive (CS) workload applications. Cache lines allocated by loads of the intra-warp locality type may not be efficiently reused, even though they are referenced multiple times. Also, intra-warp locality type may have a long reuse distance, which is a result of GPU warp schedulers that interleave warps, where even instructions that are close-by in a warp may be effectively separated by a large time interval. As such, intra-warp locality type data may suffer frequent interference by many accesses from other warps leading to premature eviction of cache lines. WAPC management schemes utilized herein may exploit this data locality by protecting the cache lines allocated by loads of intra-warp locality type until they are mostly finished with their reuse.

Figure 11:
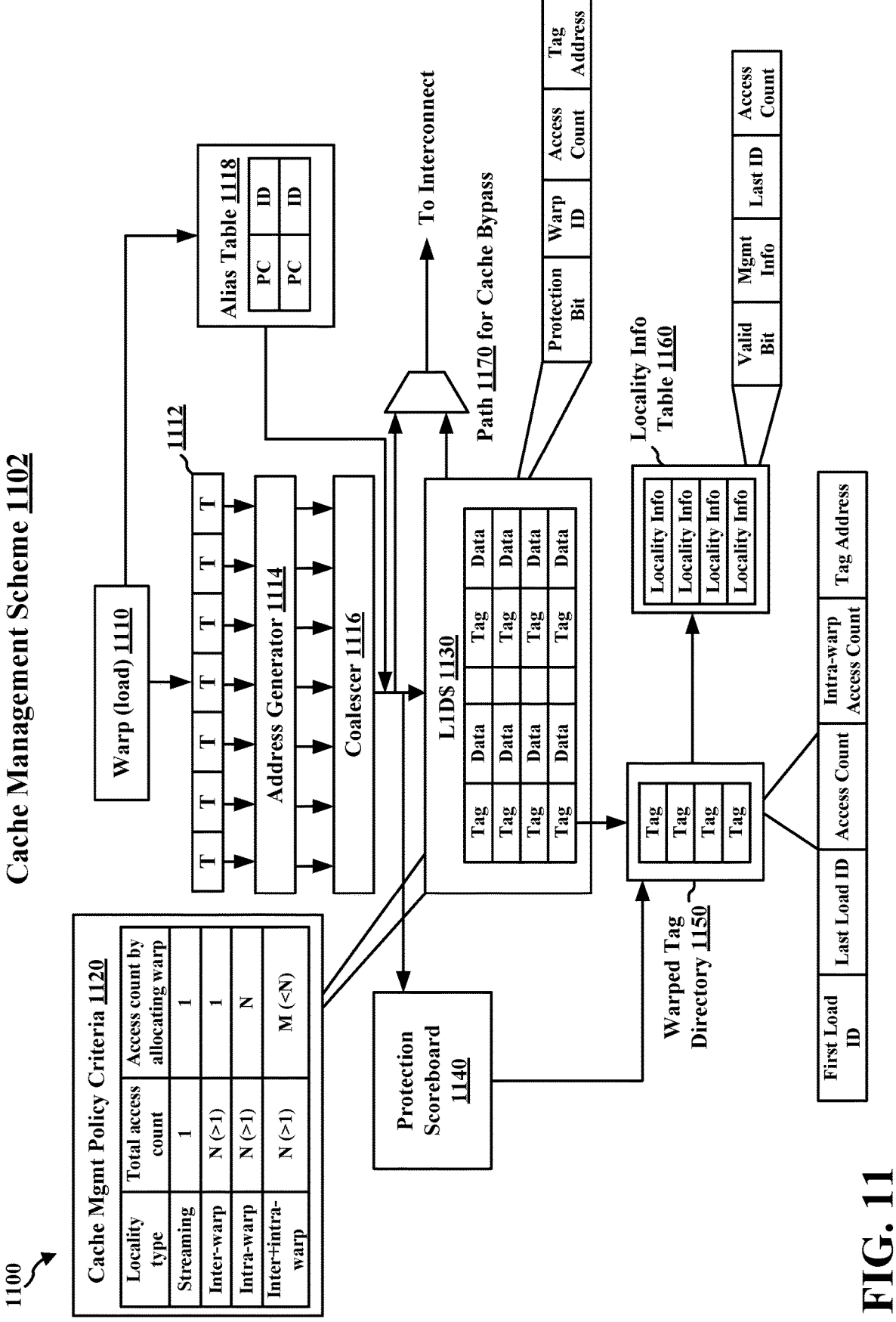
FIG. 11 is a diagram illustrating an example of a cache management scheme.

FIG. 11 illustrates diagram 1100 including one example of a cache management scheme. More specifically, diagram 1100 depicts cache management scheme 1102 including an architecture for a WAPC management scheme. As shown in FIG. 11, diagram 1100 includes warp (load) 1110, threads 1112, address generator 1114, coalescer 1116, alias table 1118, cache management policy criteria 1120, L1 data cache 1130, protection scoreboard 1140, warped tag directory 1150, locality information table 1160, and path 1170 for cache bypass. FIG. 11 depicts that warp (load) 1110 is separated into threads 1112, which are sent to address generator 1114 and then coalescer 1116. The information associated with a load program counter (PC) for the set of workloads may be converted to a set of load identifiers (IDs) for the set of workloads. The load PCs and the load IDs may be stored in the alias table 1118. This information be sent from alias table to L1 data cache 1130, along with the information from coalescer 1116. The L1 data cache 1130 may include a number of tags and data, as well as a protection bit, a warp ID, an access count, and/or a tag address. Also, the L1 data cache 1130 may store information for cache management policy criteria 1120, which may include a data locality type (e.g., streaming data locality, inter-warp locality, intra-warp locality, and/or inter-intra-warp locality), a total access count, and an access count by allocating a warp. Information may also be sent to protection scoreboard 1140 which may determine whether to configure or store the locality information associated with the locality of each of the at least one second set of workloads. The protection scoreboard 1140 may send information to a warped tag directory (WTG) (e.g., warped tag directory 1150). Also, information from L1 data cache 1130 may be sent to warped tag directory 1150. The warped tag directory 1150 may include a first load ID, a last load ID, an access count, an intra-warp access count, and/or a tag address. The warped tag directory 1150 may send information to a locality information table (LIT) (e.g., locality information table 1160). The locality information table 1160 may include a valid bit, management information, a last ID, and an access count. The management information may be cache line management information (e.g., information regarding whether to store or bypass the cache line). The L1 data cache 1130 may output information regarding the path 1170 for cache bypass, which may include outputting an indication of a storage, or a refrainment from storage, of data for a set of workloads. The information regarding the path 1170 for cache bypass may be sent to an interconnect unit.

As shown in FIG. 11, aspects presented herein may utilize a cache management scheme 1102 that proposes changes to an L1 cache access pipeline of a LD/ST unit in GPU cores. Aspects presented herein may include structures like an alias table (AT) (e.g., alias table 1118), a warped tag directory (WTD) (e.g., warped tag directory 1150), a locality information table (LIT) (e.g., locality information table 1160), a protection scoreboard (PSB) (e.g., protection scoreboard 1140), and a cache bypass path (e.g., path 1170 for cache bypass). WAPC management schemes utilized herein may track the access history of pilot warp in warped tag directory 1150. FIG. 11 shows the structure of one entry in a warped tag directory. There may be four additional fields in each tag entry alongside the usual tag information. The first and last load ID fields may store which load instruction first allocated a given cache line and the last load instruction that accessed that cache line. Also, the access count field may store the total number of times a given cache line is accessed by any warp (including a pilot warp), and the intra-warp access count may track how many times the pilot warp alone accessed that cache line. When a global load instruction is first executed, the load PC may be hashed to create a shorter load ID. The load PC and the load ID may then be stored in a N-entry content-addressable memory (CAM) of alias table 1118.

As further shown in FIG. 11, in some aspects, if the load has already been executed at least once before, the alias table 1118 may have an entry for that load PC and that load ID may be retrieved. If the load instruction originates from a pilot warp, the load address may be used to generate an index into the warped tag directory 1150. The warped tag directory 1150 may work like a cache tag array. For instance, when a memory request from the pilot warp misses in the warped tag directory 1150, a tag address of this request may be allocated in the warped tag directory 1150. Also, the load ID (a hashed PC of the load instruction) may be logged in the first load ID field, and the access count field and intra-warp access count field may be set as one respectively. If this tag is hit by other requests after allocation, the load ID of the requests may be stored in the last load ID field. Future accesses to this cache line from the pilot warp may increment both the access count and intra-warp access count fields. Moreover, the access count field may be incremented if load instructions from all other warps (other than the pilot warp) hit the WTD entry. If a single warp load generates more than two memory addresses (e.g., uncoalesced loads), then the first two requests may allocate the WTD tag while the other accesses from the same load may be dropped. It is also possible that a request from the pilot warp hits in the L1 data cache 1130 and misses in the warped tag directory 1150. This may occur when the cache line is first allocated by any warp other than the pilot warp, and then the request from the pilot warp hits in the cache. In that case, the access count from the L1 cache tag may be used to initialize the WTD tag. To support this case, the L1 cache tag may be augmented to track the access count (e.g., access count field), which simply tracks the number of times that a cache line is accessed by any warp. The remaining fields (e.g., protection and warp ID) may be used for cache line protection.

As further shown in FIG. 11, the locality information table 1160 may manage the tracked data locality type and data access dependency information per load. That is, an entry of the locality information table (LIT) 1160 may be updated when a WTD tag is evicted due to address conflicts, or the access count of a WTD entry exceeds the predefined threshold value. Each entry of the locality information table 1160 may be indexed by the load ID stored in the first load ID field from the WTD entry. The management method field may store the cache management scheme that is selected for the corresponding load instruction. The management field may use access count and intra-warp access count fields from the WTD entry to determine the load locality type using the criteria defined herein. For streaming data, the management method may be set to bypassing, and if the load exhibits intra-warp locality the management method may be set to protection. Otherwise, the normal cache management scheme may be set. The access count and last load ID fields may be copied from the WTD tag. After a WTD tag associated with a load ID is evicted, the same load ID may execute again from the pilot warp and reallocate a new WTD entry. Thus, before the pilot warp completes execution, the WTD entry may potentially be evicted and allocated multiple times by the same load. Since the LIT entry may be indexed using the load ID on each WTD entry eviction, the LIT entry may also be updated. Aspects presented herein may overwrite an entry of LIT with the new information if the access count value in a WTD entry is larger than the current access count stored in the LIT entry. Finally, after a pilot warp finishes execution, all the WTD entries may be scanned and each WTD entry may update the LIT. Then all the WTD entries may be invalidated and may be used again for monitoring a different kernel execution.

As further shown in FIG. 11, the cache management scheme 1102 may utilize a load instruction that uses the load ID to index into a direct mapped LIT. If the LIT entry indexed by the load ID is valid, the cache management scheme 1102 as specified in the management method field may be applied for that load. Some possible cache management methods are: normal, bypassing, and/or protection. If the management method specifies normal, the load may go through the normal GPU cache access process. If a load is categorized as a bypassing type, requests from the load may be directly assigned to the interconnection without accessing the L1 data cache 1130. If the load access specifies protection, the allocated cache line may be pinned as a protected line by setting the protection bit of the cache tag in the L1 data cache 1130. In addition, the warp ID field of the corresponding cache line may also be set to the current warp ID of the load instruction. Finally, aspects presented herein may utilize a mechanism to determine when to unpin the protected cache lines.

As further depicted in FIG. 11, the validity of the protected lines may be controlled by a protection status board (PSB). The PSB may have one entry per warp. When a load instruction in a warp allocates a protected cache line, the PSB bit for that warp may be set to one. The last load ID from the locality information table 1160 may be copied into the PSB entry for the warp. From then on, the PSB may track if the load instruction mapped into the last load ID has completed execution at which time the PSB bit is reset to zero, which means the cache lines for that warp may no longer be protected. If the last load ID of an entry in locality information table 1160 is identical to the load ID used in indexing that entry, the loop indication bit of the PSB entry may be set in order to mark the load instruction as being part of an iterative loop. For this case, the protected lines may be pinned until the warp escapes the loop. Aspects presented herein may use a single instruction, multiple threads (SIMT) stack to track when a load instruction exits the loop. In the implementation herein, the PSB may track a single protected load instruction per warp. In any given warp, a single load instruction may need to be protected in practice. Hence, if the PSB entry was already set by a former load instruction in a certain warp, the protection control for other load instructions may be ignored in that warp until the PSB entry is released.

FIG. 12 illustrates diagram 1200, diagram 1220, diagram 1240, and diagram 1260 including examples of a cache management scheme. More specifically, diagram 1200, diagram 1220, diagram 1240, and diagram 1260 depict cache management schemes including a WAPC management scheme. As shown in FIG. 12, diagram 1200 includes warp0 1202, load A 1204, warp1 1206, PSB 1210, W0, W1, L1 cache 1216, protect instruction, and warp ID. Diagram 1220 includes warp0 1222, load A 1224, warp1 1226, load A 1228 (bypass), PSB 1230, W0, W1, L1 cache 1236, protect instruction, and warp ID. Also, diagram 1240 includes warp0 1242, load A 1244, load A (hit), branch, warp1 1246, load A 1248 (bypass), PSB 1250, W0, W1, L1 cache 1256, protect instruction, and warp ID. Diagram 1260 includes warp0 1262, load A 1264, load A (hit), branch, warp1 1266, load A 1268, PSB 1270, W0, W1, L1 cache 1276, protect instruction, and warp ID. FIG. 12 depicts four examples (diagram 1200, diagram 1220, diagram 1240, and diagram 1260) of a WAPC management scheme.

As shown in diagram 1200, the examples in diagram 1200 assumes that a pilot warp has completed execution and data fetched by load instruction (load A) has been determined to be accessed multiple times within a loop during the pilot warp execution. The WTD entry accessed by the address from load A 1204 would have marked the first load and last load fields to be the same load ID, and the access count and intra-warp access count fields may also be the same at the end of the pilot warp execution. Based on this WTD entry information, the LIT entry may be updated to indicate that the load A 1204 is characterized as an intra-warp locality load. The management method for the LIT entry indexed by the load A 1204 may have been set to be protection based for intra-warp loads. Consider there are two warps: warp0 1202 and warp1 1206. First, warp0 1202 executes load A 1204. The LIT entry indexed by that load ID may be valid and its management method may be set to protection. At this time, the PSB of warp0 1202 may be set to 1, indicating the data fetched for load A 1204 into the L1 cache may be protected. Once the data is fetched in the L1 cache, the protection bit in the cache line may be set to 1 and the warp ID field of the cache line may be set to warp0 1202. From then on, warp0 1202 may continue to protect the cache lines fetched by load A 1204 until that load exits the loop.

As shown in diagram 1220, the L1 cache 1236 may be direct-mapped and warp1 1226 may executes load A 1228. Since the LIT is indexed by load ID, and is warp independent, the LIT entry for load A 1228 from warp1 1226 may have also indicated that the load specifies protected cache lines. The load A 1228 from warp1 1226 may try to fetch data into the cache line but notices that the cache line's protection bit is already set to 1. The warp ID may be set to warp0 1222 for that protected cache line, and the PSB entry for warp0 1222 may be still set to one, namely warp0 1222 has not exited the loop. Rather than evict a protected cache line, the data fetched by load A 1228 from warp1 1226 may then simply bypass the cache, as shown in diagram 1220.

As shown in diagram 1240, the bit for warp1 1246 in PSB may not be set since the request from warp1 1246 was not pinned. In diagram 1240, the repeated load A 1244 from warp0 1242 hits the protected cache line multiple times and eventually the loop terminates. Then the bit for warp0 1242 in PSB may be reset since the lifetime for the protected cache line ends.

As shown in diagram 1260, at this time if warp1 1266 is still executing load A 1268 in loop, it may continue to attempt to allocate a cache line and protect it on each execution of the load. After warp0 1262 exits the loop, warp1 1266 may see the cache line to be protected. But warp0 1262 stored in the cache line may be used to access PSB and eventually PSB may indicate that warp0 1262 is no longer protected. At this time, the cache line protection bit is reset and warp1 1266 may allocate that cache line and then may set its protection bit and sets the warp id to warp1 1266. The PSB for warp1 1266 may now be set to 1, as shown in diagram 1260.

Aspects of the present disclosure may include a number of benefits or advantages. For instance, aspects of the present disclosure may utilize a cache (e.g., an L1 data cache) or bypass utilizing a cache based on a detection of a locality of a workload. Based on this, aspects of the present disclosure may efficiently utilize of GPU caches, as the use of GPU caches may be optimized. Aspects presented herein may utilize a cache management scheme that efficiently uses GPU caches based on the locality of each workload. More precisely, aspects presented herein may utilize a cache management scheme that based on per-load locality behavior. For example, aspects presented herein may identify or detect a locality of each of a set of workloads corresponding to data threads. Further, aspects presented herein may determine and store an access pattern of a cache line for a first set of workloads. By doing so, aspects presented herein may store data for at least one second set of workloads based on the access pattern of the cache line for the first set of workloads. Additionally, aspects presented herein may bypass (i.e., refrain from storing) data for at least one second set of workloads based on the access pattern of the cache line for the first set of workloads. By optimizing when data is stored in a cache (or bypassed from being stored in the cache), aspects presented herein may help to optimize the processing speed of GPUs, the amount of memory utilized by GPUs, and/or the amount of power utilized by GPUs.

Figure 13:
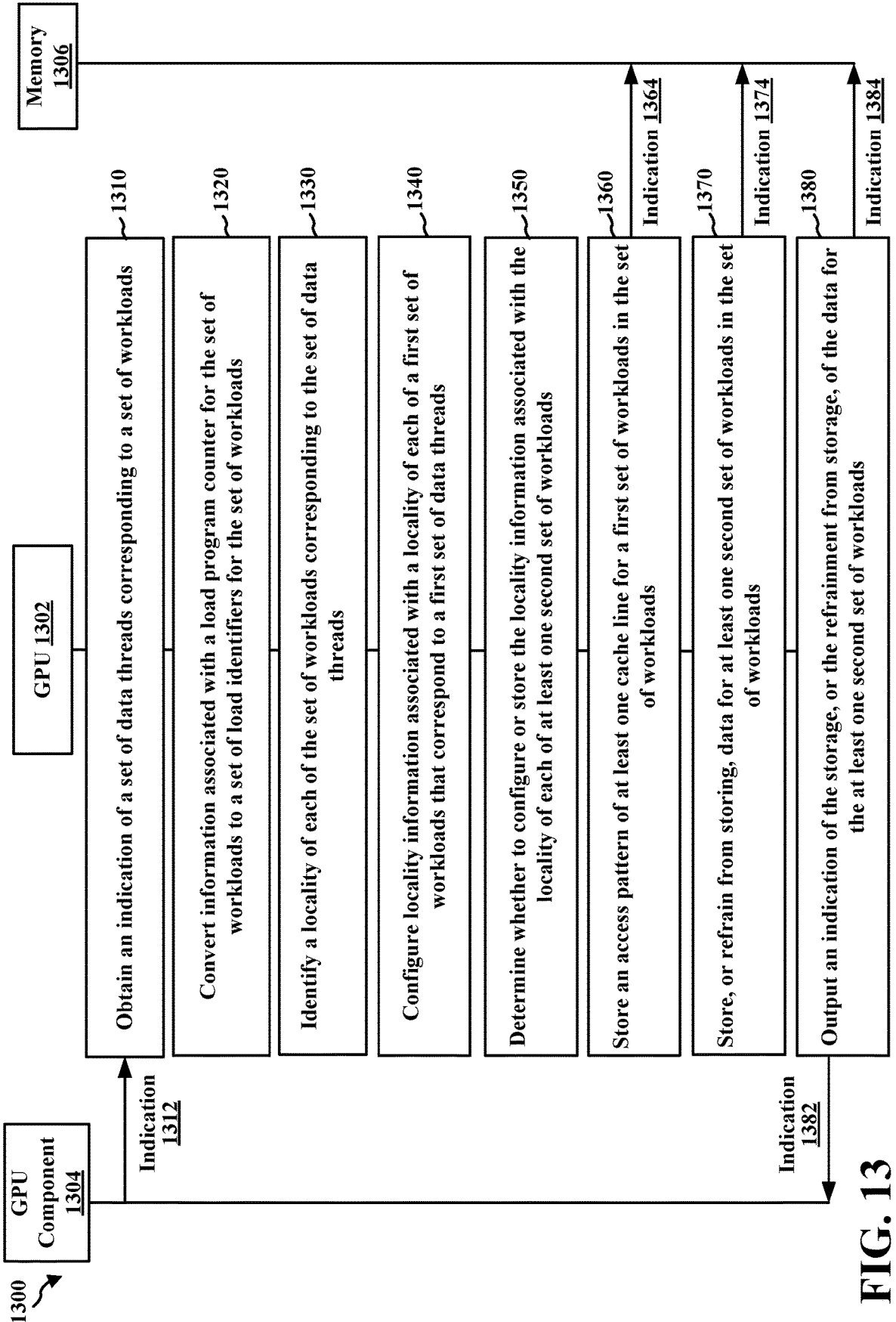
FIG. 13 is a communication flow diagram illustrating example communications between a GPU, a GPU component, and a memory.

FIG. 13 is a communication flow diagram 1300 of data processing or graphics processing in accordance with one or more techniques of this disclosure. As shown in FIG. 13, diagram 1300 includes example communications between GPU 1302 (e.g., a GPU, a cache at a GPU, a GPU component, another graphics processor, a CPU, a CPU component, or another central processor), GPU component 1304 (e.g., a GPU, a cache at a GPU, a GPU component, another graphics processor, a CPU, a CPU component, or another central processor), and memory 1306 (e.g., a memory, a cache, a system memory, a graphics memory, a memory or cache at a CPU, or a memory or cache at a GPU), in accordance with one or more techniques of this disclosure.

At 1310, GPU 1302 may obtain an indication of a set of data threads associated with graphics processing, where the set of data threads corresponds to a set of workloads. In some aspects, the set of workloads may be a set of graphics workloads at a graphics processing unit (GPU). Also, obtaining the indication of the set of data threads may comprise: receiving the indication of the set of data threads from at least one component at the GPU or a kernel at the GPU (e.g., GPU 1302 may receive indication 1312 from GPU component 1304).

At 1320, GPU 1302 may convert information associated with a load program counter (PC) for the set of workloads to a set of load identifiers (IDs) for the set of workloads. Also, at 1320, GPU 1302 may store, based on the conversion of the information, the set of load IDs for the set of workloads in an alias table.

At 1330, GPU 1302 may identify a locality of each of the set of workloads corresponding to the set of data threads, where the locality of each of the set of workloads is associated with an access pattern of at least one cache line of a cache for each of the set of workloads. The locality of each of the set of workloads may be at least one of a spatial locality or a temporal locality. The spatial locality may be associated with a reusability of an address of the cache, and the temporal locality may be associated with a reusability of a time for accessing the cache. The set of data threads may be associated with a warp, the cache may be a level 1 (L1) data cache, and the L1 data cache may include at least one of: a protection bit, a set of warp identifiers (IDs), an access count, or a set of tag addresses. Also, the set of tag addresses may include information associated with at least one of: an inter-warp locality, an intra-warp locality, or an inter-intra-warp locality, where the inter-warp locality may be associated with data being fetched by a load instruction from a first warp that is also accessed by a same load program counter (PC) across multiple warps, where the intra-warp locality may be associated with data being fetched by a load instruction from a second warp and used within a same warp for the data, and where the inter-intra-warp locality may be associated with data being brought into the cache by a third warp and re-referenced by other warps. In some aspects, the access pattern of the at least one cache line may correspond to a reusability of the at least one cache line, or the access pattern of the at least one cache line may correspond to whether a reusable level of a workload is greater than or less than a reusable threshold.

At 1340, GPU 1302 may configure locality information associated with a locality of each of the first set of workloads in the set of workloads that correspond to the first set of data threads in the set of data threads. In some aspects, configuring the locality information associated with the locality of each of the first set of workloads may comprise: configuring the locality information associated with the locality of each of the first set of workloads based on a set of tag addresses for the access pattern of the at least one cache line. The set of tag addresses for the access pattern of the at least one cache line may be associated with a warped tag directory. Also, the locality information may include at least one of cache line management information, a valid bit, a last load identifier (ID), or an access count. Also, the locality information may be associated with a locality information table, and storing the access pattern of the at least one cache line may comprise storing, in the locality information table, the access pattern of the at least one cache line.

At 1350, GPU 1302 may determine whether to configure or store the locality information associated with the locality of each of the at least one second set of workloads.

At 1360, GPU 1302 may store, based on the locality of each of the set of workloads, the access pattern of the at least one cache line for a first set of workloads in the set of workloads, where the first set of workloads corresponds to a first set of data threads in the set of data threads (e.g., GPU 1302 may store indication 1364 in memory 1306).

At 1370, GPU 1302 may store, or refrain from storing, data for at least one second set of workloads in the set of workloads based on the access pattern of the at least one cache line for the first set of workloads. In some aspects, storing the data for the at least one second set of workloads may comprise: storing the data for the at least one second set of workloads in a memory or the cache at a graphics processing unit (GPU) (e.g., GPU 1302 may store indication 1374 in memory 1306). Also, refraining from storing the data for the at least one second set of workloads may comprise: bypassing storing the data for the at least one second set of workloads at a graphics processing unit (GPU).

At 1380, GPU 1302 may output an indication of the storage, or the refrainment from storage, of the data for the at least one second set of workloads. In some aspects, outputting the indication of the storage, or the refrainment from storage, of the data for the at least one second set of workloads may comprise: transmitting the indication of the storage, or the refrainment from storage, of the data for the at least one second set of workloads (e.g., GPU 1302 may transmit indication 1382 to GPU component 1304); or storing the indication of the storage, or the refrainment from storage, of the data for the at least one second set of workloads (e.g., GPU 1302 may store indication 1384 in memory 1306).

Figure 14:
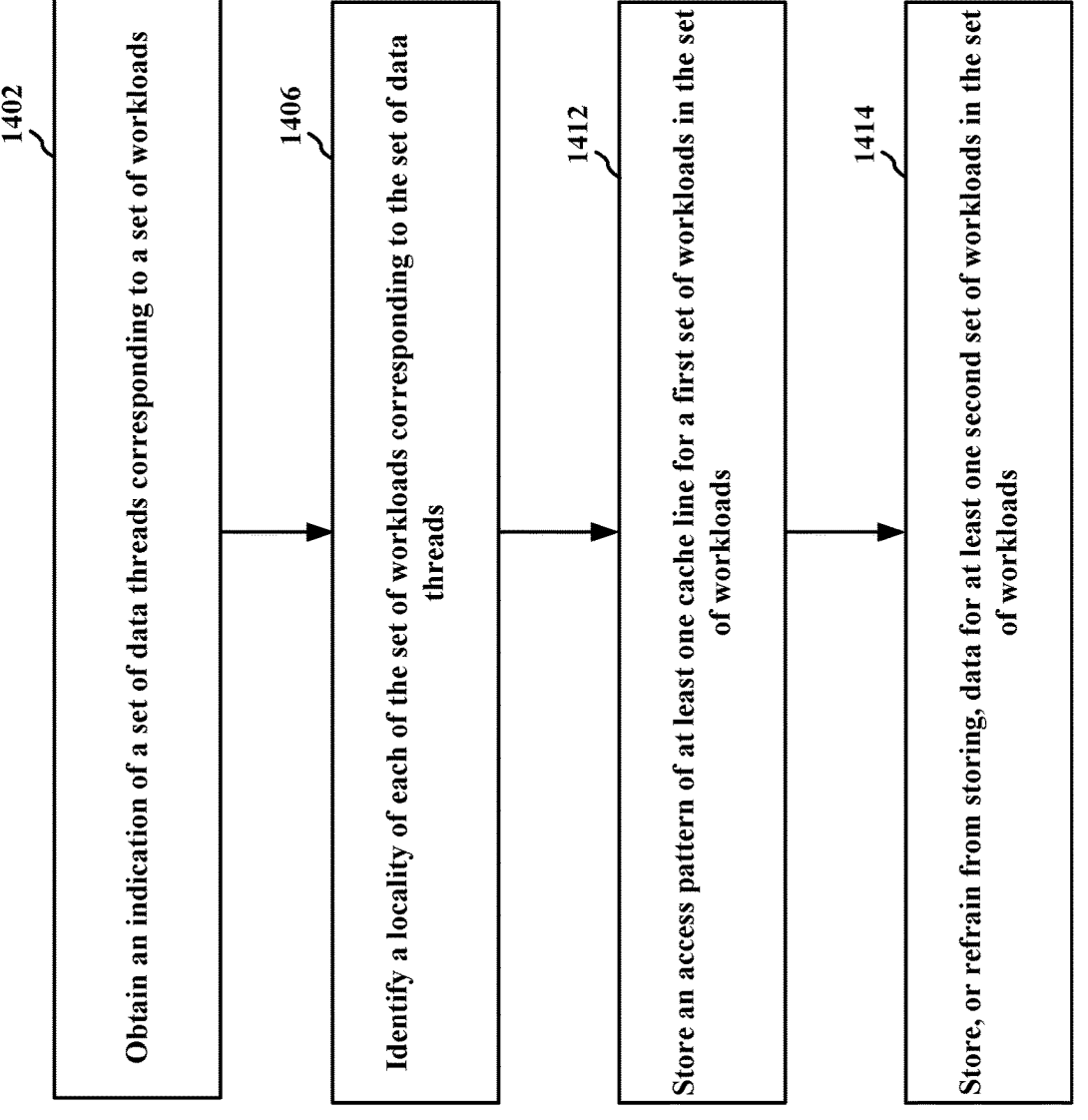
FIG. 14 is a flowchart of an example method of data processing.

FIG. 14 is a flowchart 1400 of an example method of data processing or graphics processing in accordance with one or more techniques of this disclosure. The method may be performed by a GPU (e.g., a GPU, a cache at a GPU, a GPU component, another graphics processor, a CPU, a CPU component, or another central processor), a CPU (e.g., a CPU, a cache at a CPU, a CPU component, another central processor, a GPU, a GPU component, or another graphics processor), a display driver integrated circuit (DDIC), an apparatus for data or graphics processing, a wireless communication device, and/or any apparatus that may perform data or graphics processing as used in connection with the examples of FIGS. 1-13.

At 1402, the GPU may obtain an indication of a set of data threads associated with graphics processing, where the set of data threads corresponds to a set of workloads, as described in connection with the examples in FIGS. 1-13. For example, as described in 1310 of FIG. 13, GPU 1302 may obtain an indication of a set of data threads associated with graphics processing, where the set of data threads corresponds to a set of workloads. Further, step 1402 may be performed by processing unit 120 in FIG. 1. In some aspects, the set of workloads may be a set of graphics workloads at a graphics processing unit (GPU). Also, obtaining the indication of the set of data threads may comprise: receiving the indication of the set of data threads from at least one component at the GPU or a kernel at the GPU (e.g., GPU 1302 may receive indication 1312 from GPU component 1304).

At 1406, the GPU may identify a locality of each of the set of workloads corresponding to the set of data threads, where the locality of each of the set of workloads is associated with an access pattern of at least one cache line of a cache for each of the set of workloads, as described in connection with the examples in FIGS. 1-13. For example, as described in 1330 of FIG. 13, GPU 1302 may identify a locality of each of the set of workloads corresponding to the set of data threads, where the locality of each of the set of workloads is associated with an access pattern of at least one cache line of a cache for each of the set of workloads. Further, step 1406 may be performed by processing unit 120 in FIG. 1. The locality of each of the set of workloads may be at least one of a spatial locality or a temporal locality. The spatial locality may be associated with a reusability of an address of the cache, and the temporal locality may be associated with a reusability of a time for accessing the cache. The set of data threads may be associated with a warp, the cache may be a level 1 (L1) data cache, and the L1 data cache may include at least one of: a protection bit, a set of warp identifiers (IDs), an access count, or a set of tag addresses. Also, the set of tag addresses may include information associated with at least one of: an inter-warp locality, an intra-warp locality, or an inter-intra-warp locality, where the inter-warp locality may be associated with data being fetched by a load instruction from a first warp that is also accessed by a same load program counter (PC) across multiple warps, where the intra-warp locality may be associated with data being fetched by a load instruction from a second warp and used within a same warp for the data, and where the inter-intra-warp locality may be associated with data being brought into the cache by a third warp and re-referenced by other warps. In some aspects, the access pattern of the at least one cache line may correspond to a reusability of the at least one cache line, or the access pattern of the at least one cache line may correspond to whether a reusable level of a workload is greater than or less than a reusable threshold.

At 1412, the GPU may store, based on the locality of each of the set of workloads, the access pattern of the at least one cache line for a first set of workloads in the set of workloads, where the first set of workloads corresponds to a first set of data threads in the set of data threads, as described in connection with the examples in FIGS. 1-13. For example, as described in 1360 of FIG. 13, GPU 1302 may store, based on the locality of each of the set of workloads, the access pattern of the at least one cache line for a first set of workloads in the set of workloads, where the first set of workloads corresponds to a first set of data threads in the set of data threads. Further, step 1412 may be performed by processing unit 120 in FIG. 1.

At 1414, the GPU may store, or refrain from storing, data for at least one second set of workloads in the set of workloads based on the access pattern of the at least one cache line for the first set of workloads, as described in connection with the examples in FIGS. 1-13. For example, as described in 1370 of FIG. 13, GPU 1302 may store, or refrain from storing, data for at least one second set of workloads in the set of workloads based on the access pattern of the at least one cache line for the first set of workloads. Further, step 1414 may be performed by processing unit 120 in FIG. 1. In some aspects, storing the data for the at least one second set of workloads may comprise: storing the data for the at least one second set of workloads in a memory or the cache at a graphics processing unit (GPU) (e.g., GPU 1302 may store indication 1374 in memory 1306). Also, refraining from storing the data for the at least one second set of workloads may comprise: bypassing storing the data for the at least one second set of workloads at a graphics processing unit (GPU).

FIG. 15 is a flowchart 1500 of an example method of data processing or graphics processing in accordance with one or more techniques of this disclosure. The method may be performed by a GPU (e.g., a GPU, a cache at a GPU, a GPU component, another graphics processor, a CPU, a CPU component, or another central processor), a CPU (e.g., a CPU, a cache at a CPU, a CPU component, another central processor, a GPU, a GPU component, or another graphics processor), a display driver integrated circuit (DDIC), an apparatus for data or graphics processing, a wireless communication device, and/or any apparatus that may perform data or graphics processing as used in connection with the examples of FIGS. 1-13.

At 1502, the GPU may obtain an indication of a set of data threads associated with graphics processing, where the set of data threads corresponds to a set of workloads, as described in connection with the examples in FIGS. 1-13. For example, as described in 1310 of FIG. 13, GPU 1302 may obtain an indication of a set of data threads associated with graphics processing, where the set of data threads corresponds to a set of workloads. Further, step 1502 may be performed by processing unit 120 in FIG. 1. In some aspects, the set of workloads may be a set of graphics workloads at a graphics processing unit (GPU). Also, obtaining the indication of the set of data threads may comprise: receiving the indication of the set of data threads from at least one component at the GPU or a kernel at the GPU (e.g., GPU 1302 may receive indication 1312 from GPU component 1304).

At 1504, the GPU may convert information associated with a load program counter (PC) for the set of workloads to a set of load identifiers (IDs) for the set of workloads, as described in connection with the examples in FIGS. 1-13. For example, as described in 1320 of FIG. 13, GPU 1302 may convert information associated with a load program counter (PC) for the set of workloads to a set of load identifiers (IDs) for the set of workloads. Further, step 1504 may be performed by processing unit 120 in FIG. 1. Also, at 1504, the GPU may store, based on the conversion of the information, the set of load IDs for the set of workloads in an alias table, as described in connection with the examples in FIGS. 1-13. For example, as described in 1320 of FIG. 13, GPU 1302 may store, based on the conversion of the information, the set of load IDs for the set of workloads in an alias table. Further, step 1504 may be performed by processing unit 120 in FIG. 1.

At 1506, the GPU may identify a locality of each of the set of workloads corresponding to the set of data threads, where the locality of each of the set of workloads is associated with an access pattern of at least one cache line of a cache for each of the set of workloads, as described in connection with the examples in FIGS. 1-13. For example, as described in 1330 of FIG. 13, GPU 1302 may identify a locality of each of the set of workloads corresponding to the set of data threads, where the locality of each of the set of workloads is associated with an access pattern of at least one cache line of a cache for each of the set of workloads. Further, step 1506 may be performed by processing unit 120 in FIG. 1. The locality of each of the set of workloads may be at least one of a spatial locality or a temporal locality. The spatial locality may be associated with a reusability of an address of the cache, and the temporal locality may be associated with a reusability of a time for accessing the cache. The set of data threads may be associated with a warp, the cache may be a level 1 (L1) data cache, and the L1 data cache may include at least one of: a protection bit, a set of warp identifiers (IDs), an access count, or a set of tag addresses. Also, the set of tag addresses may include information associated with at least one of: an inter-warp locality, an intra-warp locality, or an inter-intra-warp locality, where the inter-warp locality may be associated with data being fetched by a load instruction from a first warp that is also accessed by a same load program counter (PC) across multiple warps, where the intra-warp locality may be associated with data being fetched by a load instruction from a second warp and used within a same warp for the data, and where the inter-intra-warp locality may be associated with data being brought into the cache by a third warp and re-referenced by other warps. In some aspects, the access pattern of the at least one cache line may correspond to a reusability of the at least one cache line, or the access pattern of the at least one cache line may correspond to whether a reusable level of a workload is greater than or less than a reusable threshold.

At 1508, the GPU may configure locality information associated with a locality of each of the first set of workloads in the set of workloads that correspond to the first set of data threads in the set of data threads, as described in connection with the examples in FIGS. 1-13. For example, as described in 1340 of FIG. 13, GPU 1302 may configure locality information associated with a locality of each of the first set of workloads in the set of workloads that correspond to the first set of data threads in the set of data threads. Further, step 1508 may be performed by processing unit 120 in FIG. 1. In some aspects, configuring the locality information associated with the locality of each of the first set of workloads may comprise: configuring the locality information associated with the locality of each of the first set of workloads based on a set of tag addresses for the access pattern of the at least one cache line. The set of tag addresses for the access pattern of the at least one cache line may be associated with a warped tag directory. Also, the locality information may include at least one of cache line management information, a valid bit, a last load identifier (ID), or an access count. Also, the locality information may be associated with a locality information table, and storing the access pattern of the at least one cache line may comprise storing, in the locality information table, the access pattern of the at least one cache line.

At 1510, the GPU may determine whether to configure or store the locality information associated with the locality of each of the at least one second set of workloads, as described in connection with the examples in FIGS. 1-13. For example, as described in 1350 of FIG. 13, GPU 1302 may determine whether to configure or store the locality information associated with the locality of each of the at least one second set of workloads. Further, step 1510 may be performed by processing unit 120 in FIG. 1.

At 1512, the GPU may store, based on the locality of each of the set of workloads, the access pattern of the at least one cache line for a first set of workloads in the set of workloads, where the first set of workloads corresponds to a first set of data threads in the set of data threads, as described in connection with the examples in FIGS. 1-13. For example, as described in 1360 of FIG. 13, GPU 1302 may store, based on the locality of each of the set of workloads, the access pattern of the at least one cache line for a first set of workloads in the set of workloads, where the first set of workloads corresponds to a first set of data threads in the set of data threads. Further, step 1512 may be performed by processing unit 120 in FIG. 1.

At 1514, the GPU may store, or refrain from storing, data for at least one second set of workloads in the set of workloads based on the access pattern of the at least one cache line for the first set of workloads, as described in connection with the examples in FIGS. 1-13. For example, as described in 1370 of FIG. 13, GPU 1302 may store, or refrain from storing, data for at least one second set of workloads in the set of workloads based on the access pattern of the at least one cache line for the first set of workloads. Further, step 1514 may be performed by processing unit 120 in FIG. 1. In some aspects, storing the data for the at least one second set of workloads may comprise: storing the data for the at least one second set of workloads in a memory or the cache at a graphics processing unit (GPU) (e.g., GPU 1302 may store indication 1374 in memory 1306). Also, refraining from storing the data for the at least one second set of workloads may comprise: bypassing storing the data for the at least one second set of workloads at a graphics processing unit (GPU).

At 1516, the GPU may output an indication of the storage, or the refrainment from storage, of the data for the at least one second set of workloads, as described in connection with the examples in FIGS. 1-13. For example, as described in 1380 of FIG. 13, GPU 1302 may output an indication of the storage, or the refrainment from storage, of the data for the at least one second set of workloads. Further, step 1516 may be performed by processing unit 120 in FIG. 1. In some aspects, outputting the indication of the storage, or the refrainment from storage, of the data for the at least one second set of workloads may comprise: transmitting the indication of the storage, or the refrainment from storage, of the data for the at least one second set of workloads (e.g., GPU 1302 may transmit indication 1382 to GPU component 1304); or storing the indication of the storage, or the refrainment from storage, of the data for the at least one second set of workloads (e.g., GPU 1302 may store indication 1384 in memory 1306).

In configurations, a method or an apparatus for data or graphics processing is provided. The apparatus may be a GPU (or other graphics processor), a CPU (or other central processor), a DDIC, an apparatus for graphics processing, and/or some other processor that may perform data or graphics processing. In aspects, the apparatus may be the processing unit 120 within the device 104, or may be some other hardware within the device 104 or another device. The apparatus, e.g., processing unit 120, may include means for obtaining an indication of a set of data threads associated with graphics processing, where the set of data threads corresponds to a set of workloads. The apparatus, e.g., processing unit 120, may also include means for identifying a locality of each of the set of workloads corresponding to the set of data threads, where the locality of each of the set of workloads is associated with an access pattern of at least one cache line of a cache for each of the set of workloads. The apparatus, e.g., processing unit 120, may also include means for storing, based on the locality of each of the set of workloads, the access pattern of the at least one cache line for a first set of workloads in the set of workloads, where the first set of workloads corresponds to a first set of data threads in the set of data threads. The apparatus, e.g., processing unit 120, may also include means for storing, or refraining from storing, data for at least one second set of workloads in the set of workloads based on the access pattern of the at least one cache line for the first set of workloads. The apparatus, e.g., processing unit 120, may also include means for converting information associated with a load program counter (PC) for the set of workloads to a set of load identifiers (IDs) for the set of workloads. The apparatus, e.g., processing unit 120, may also include means for storing, based on the conversion of the information, the set of load IDs for the set of workloads in an alias table. The apparatus, e.g., processing unit 120, may also include means for configuring locality information associated with a locality of each of the first set of workloads in the set of workloads that correspond to the first set of data threads in the set of data threads. The apparatus, e.g., processing unit 120, may also include means for determining whether to configure or store the locality information associated with the locality of each of the at least one second set of workloads. The apparatus, e.g., processing unit 120, may also include means for outputting an indication of the storage, or the refrainment from storage, of the data for the at least one second set of workloads.

The subject matter described herein may be implemented to realize one or more benefits or advantages. For instance, the described data or graphics processing techniques may be used by a cache, a GPU, a CPU, a central processor, or some other processor that may perform data or graphics processing to implement the cache management techniques described herein. This may also be accomplished at a low cost compared to other data or graphics processing techniques. Moreover, the data or graphics processing techniques herein may improve or speed up data processing or execution. Further, the data or graphics processing techniques herein may improve resource or data utilization and/or resource efficiency. Additionally, aspects of the present disclosure may utilize cache management techniques in order to improve memory bandwidth efficiency and/or increase processing speed at a cache, a CPU, a GPU, or a DPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for data processing, including at least one memory and at least one processor coupled to the at least one memory and, based at least in part on information stored in the at least one memory, the at least one processor, individually or in any combination, is configured to: obtain an indication of a set of data threads associated with graphics processing, wherein the set of data threads corresponds to a set of workloads; identify a locality of each of the set of workloads corresponding to the set of data threads, wherein the locality of each of the set of workloads is associated with an access pattern of at least one cache line of a cache for each of the set of workloads; store, based on the locality of each of the set of workloads, the access pattern of the at least one cache line for a first set of workloads in the set of workloads, wherein the first set of workloads corresponds to a first set of data threads in the set of data threads; and store, or refrain from storing, data for at least one second set of workloads in the set of workloads based on the access pattern of the at least one cache line for the first set of workloads.

Aspect 2 is the apparatus of aspect 1, wherein the locality of each of the set of workloads is at least one of a spatial locality or a temporal locality.

Aspect 3 is the apparatus of aspect 2, wherein the spatial locality is associated with a reusability of an address of the cache, and wherein the temporal locality is associated with a reusability of a time for accessing the cache.

Aspect 4 is the apparatus of any of aspects 1 to 3, wherein the at least one processor, individually or in any combination, is further configured to: convert information associated with a load program counter (PC) for the set of workloads to a set of load identifiers (IDs) for the set of workloads.

Aspect 5 is the apparatus of aspect 4, wherein the at least one processor, individually or in any combination, is further configured to: store, based on the conversion of the information, the set of load IDs for the set of workloads in an alias table.

Aspect 6 is the apparatus of any of aspects 1 to 5, wherein the set of data threads is associated with a warp, wherein the cache is a level 1 (L1) data cache, and wherein the L1 data cache includes at least one of: a protection bit, a set of warp identifiers (IDs), an access count, or a set of tag addresses.

Aspect 7 is the apparatus of aspect 6, wherein the set of tag addresses includes information associated with at least one of: an inter-warp locality, an intra-warp locality, or an inter-intra-warp locality, wherein the inter-warp locality is associated with data being fetched by a load instruction from a first warp that is also accessed by a same load program counter (PC) across multiple warps, wherein the intra-warp locality is associated with data being fetched by a load instruction from a second warp and used within a same warp for the data, and wherein the inter-intra-warp locality is associated with data being brought into the cache by a third warp and re-referenced by other warps.

Aspect 8 is the apparatus of any of aspects 1 to 7, wherein the at least one processor, individually or in any combination, is further configured to: configure locality information associated with a locality of each of the first set of workloads in the set of workloads that correspond to the first set of data threads in the set of data threads.

Aspect 9 is the apparatus of aspect 8, wherein to configure the locality information associated with the locality of each of the first set of workloads, the at least one processor, individually or in any combination, is configured to: configure the locality information associated with the locality of each of the first set of workloads based on a set of tag addresses for the access pattern of the at least one cache line.

Aspect 10 is the apparatus of aspect 9, wherein the set of tag addresses for the access pattern of the at least one cache line is associated with a warped tag directory.

Aspect 11 is the apparatus of any of aspects 8 to 10, wherein the locality information includes at least one of cache line management information, a valid bit, a last load identifier (ID), or an access count.

Aspect 12 is the apparatus of any of aspects 8 to 11, wherein the at least one processor, individually or in any combination, is further configured to: determine whether to configure or store the locality information associated with the locality of each of the at least one second set of workloads.

Aspect 13 is the apparatus of any of aspects 8 to 12, wherein the locality information is associated with a locality information table, and wherein to store the access pattern of the at least one cache line, the at least one processor, individually or in any combination, is configured to store, in the locality information table, the access pattern of the at least one cache line.

Aspect 14 is the apparatus of any of aspects 1 to 13, wherein the at least one processor, individually or in any combination, is further configured to: output an indication of the storage, or the refrainment from storage, of the data for the at least one second set of workloads.

Aspect 15 is the apparatus of aspect 14, wherein to output the indication of the storage, or the refrainment from storage, of the data for the at least one second set of workloads, the at least one processor, individually or in any combination, is configured to: transmit the indication of the storage, or the refrainment from storage, of the data for the at least one second set of workloads; or store the indication of the storage, or the refrainment from storage, of the data for the at least one second set of workloads.

Aspect 16 is the apparatus of any of aspects 1 to 15, wherein the access pattern of the at least one cache line corresponds to a reusability of the at least one cache line, or wherein the access pattern of the at least one cache line corresponds to whether a reusable level of a workload is greater than or less than a reusable threshold.

Aspect 17 is the apparatus of any of aspects 1 to 16, wherein the set of workloads is a set of graphics workloads at a graphics processing unit (GPU), and wherein to obtain the indication of the set of data threads, the at least one processor, individually or in any combination, is configured to: receive the indication of the set of data threads from at least one component at the GPU or a kernel at the GPU.

Aspect 18 is the apparatus of any of aspects 1 to 17, wherein to store the data for the at least one second set of workloads, the at least one processor, individually or in any combination, is configured to: store the data for the at least one second set of workloads in a memory or the cache at a graphics processing unit (GPU).

Aspect 19 is the apparatus of any of aspects 1 to 18, wherein to refrain from storing the data for the at least one second set of workloads, the at least one processor, individually or in any combination, is configured to: bypass storing the data for the at least one second set of workloads at a graphics processing unit (GPU).

Aspect 20 is the apparatus of any of aspects 1 to 19, further including (i.e., comprising): at least one of an antenna or a transceiver coupled to the at least one processor, wherein to obtain the indication of the set of data threads, the at least one processor is configured to: obtain, via at least one of the antenna or the transceiver, the indication of the set of data threads.

Aspect 21 is a method of data processing for implementing any of aspects 1 to 20.

Aspect 22 is an apparatus for data processing including means for implementing any of aspects 1 to 20.

Aspect 23 is a computer-readable medium (e.g., a non-transitory computer-readable medium) storing computer executable code (e.g., code for data processing), the code when executed by at least one processor causes the at least one processor to implement any of aspects 1 to 20.

What is claimed is:

1. An apparatus for data processing, comprising:
at least one memory; and
at least one processor coupled to the at least one memory and, based at least in part on information stored in the at least one memory, the at least one processor, individually or in any combination, is configured to:
obtain an indication of a set of data threads associated with graphics processing, wherein the set of data threads corresponds to a set of workloads;
identify a locality of each of the set of workloads corresponding to the set of data threads, wherein the locality of each of the set of workloads is associated with an access pattern of at least one cache line of a cache for each of the set of workloads;
store, based on the locality of each of the set of workloads, the access pattern of the at least one cache line for a first set of workloads in the set of workloads, wherein the first set of workloads corresponds to a first set of data threads in the set of data threads; and
store, or refrain from storing, data for at least one second set of workloads in the set of workloads based on the access pattern of the at least one cache line for the first set of workloads.

2. The apparatus of claim 1, wherein the locality of each of the set of workloads is at least one of a spatial locality or a temporal locality.

3. The apparatus of claim 2, wherein the spatial locality is associated with a reusability of an address of the cache, and wherein the temporal locality is associated with a reusability of a time for accessing the cache.

4. The apparatus of claim 1, wherein the at least one processor, individually or in any combination, is further configured to:

convert information associated with a load program counter (PC) for the set of workloads to a set of load identifiers (IDs) for the set of workloads.

5. The apparatus of claim 4, wherein the at least one processor, individually or in any combination, is further configured to:

store, based on the conversion of the information, the set of load IDs for the set of workloads in an alias table.

6. The apparatus of claim 1, wherein the set of data threads is associated with a warp, wherein the cache is a level 1 (L1) data cache, and wherein the L1 data cache includes at least one of: a protection bit, a set of warp identifiers (IDs), an access count, or a set of tag addresses.

7. The apparatus of claim 6, wherein the set of tag addresses includes information associated with at least one of: an inter-warp locality, an intra-warp locality, or an inter-intra-warp locality, wherein the inter-warp locality is associated with data being fetched by a load instruction from a first warp that is also accessed by a same load program counter (PC) across multiple warps, wherein the intra-warp locality is associated with data being fetched by a load instruction from a second warp and used within a same warp for the data, and wherein the inter-intra-warp locality is associated with data being brought into the cache by a third warp and re-referenced by other warps.

8. The apparatus of claim 1, wherein the at least one processor, individually or in any combination, is further configured to:

configure locality information associated with a locality of each of the first set of workloads in the set of workloads that correspond to the first set of data threads in the set of data threads.

9. The apparatus of claim 8, wherein to configure the locality information associated with the locality of each of the first set of workloads, the at least one processor, individually or in any combination, is configured to: configure the locality information associated with the locality of each of the first set of workloads based on a set of tag addresses for the access pattern of the at least one cache line.

10. The apparatus of claim 9, wherein the set of tag addresses for the access pattern of the at least one cache line is associated with a warped tag directory.

11. The apparatus of claim 8, wherein the locality information includes at least one of cache line management information, a valid bit, a last load identifier (ID), or an access count.

12. The apparatus of claim 8, wherein the at least one processor, individually or in any combination, is further configured to:

determine whether to configure or store the locality information associated with the locality of each of the at least one second set of workloads.

13. The apparatus of claim 8, wherein the locality information is associated with a locality information table, and wherein to store the access pattern of the at least one cache line, the at least one processor, individually or in any combination, is configured to store, in the locality information table, the access pattern of the at least one cache line.

14. The apparatus of claim 1, wherein the at least one processor, individually or in any combination, is further configured to:

output an indication of the storage, or the refrainment from storage, of the data for the at least one second set of workloads.

15. The apparatus of claim 14, wherein to output the indication of the storage, or the refrainment from storage, of the data for the at least one second set of workloads, the at least one processor, individually or in any combination, is configured to:

transmit the indication of the storage, or the refrainment from storage, of the data for the at least one second set of workloads; or store the indication of the storage, or the refrainment from storage, of the data for the at least one second set of workloads.

16. The apparatus of claim 1, wherein the access pattern of the at least one cache line corresponds to a reusability of the at least one cache line, or wherein the access pattern of the at least one cache line corresponds to whether a reusable level of a workload is greater than or less than a reusable threshold.

17. The apparatus of claim 1, wherein the set of workloads is a set of graphics workloads at a graphics processing unit (GPU), and wherein to obtain the indication of the set of data threads, the at least one processor, individually or in any combination, is configured to: receive the indication of the set of data threads from at least one component at the GPU or a kernel at the GPU.

18. The apparatus of claim 1, wherein to store the data for the at least one second set of workloads, the at least one processor, individually or in any combination, is configured to: store the data for the at least one second set of workloads in a memory or the cache at a graphics processing unit (GPU); and wherein to refrain from storing the data for the at least one second set of workloads, the at least one processor, individually or in any combination, is configured to: bypass storing the data for the at least one second set of workloads at the GPU.

19. A method of data processing, comprising:

obtaining an indication of a set of data threads associated with graphics processing, wherein the set of data threads corresponds to a set of workloads;

identifying a locality of each of the set of workloads corresponding to the set of data threads, wherein the locality of each of the set of workloads is associated with an access pattern of at least one cache line of a cache for each of the set of workloads;

storing, based on the locality of each of the set of workloads, the access pattern of the at least one cache line for a first set of workloads in the set of workloads, wherein the first set of workloads corresponds to a first set of data threads in the set of data threads; and storing, or refraining from storing, data for at least one second set of workloads in the set of workloads based on the access pattern of the at least one cache line for the first set of workloads.

* * * * *